US012737338B2

(12) United States Patent
Mihic et al.

(10) Patent No.: US 12,737,338 B2
(45) **Date of Patent: *Sep. 15, 2026**

(54) HYBRID SPATIAL INDEX

(71) Applicant: Microsoft Technology Licensing, LLC, Redmond, WA (US)

(72) Inventors: Bosko Mihic, Belgrade (RS); Teodor Delibasic, Novi Beograd (RS)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/006,865

(22) Filed: Dec. 31, 2024

(65) Prior Publication Data

US 2025/0139073 A1 May 1, 2025

Related U.S. Application Data

(63) Continuation of application No. 18/329,368, filed on Jun. 5, 2023, now Pat. No. 12,222,917.

(51) Int. Cl.
*G06F 16/22* (2019.01)

(52) U.S. Cl.
CPC ................................ *G06F 16/2264* (2019.01)

(58) Field of Classification Search
CPC ............................ G06F 16/2264; G06F 16/29
See application file for complete search history.

(56) References Cited

U.S. PATENT DOCUMENTS 12,061,658 B2 * 8/2024 Le ............................ G06F 16/29
2021/0406328 A1 * 12/2021 Prateek ................. G06F 16/951
2022/0049962 A1 * 2/2022 Jiang ....................... G01C 21/32
2022/0188340 A1 * 6/2022 Davis ....................... G06F 16/29
2022/0284025 A1 * 9/2022 Adams ................ G06F 16/2272

OTHER PUBLICATIONS

International Preliminary Report on Patentability (Chapter I) received for PCT Application No. PCT/US2024/030669, Dec. 18, 2025, 10 pages.

* cited by examiner

*Primary Examiner* — Dangelino N Gortayo
(74) *Attorney, Agent, or Firm* — ArentFox Schiff LLP

(57) ABSTRACT

Example implementations include a method, apparatus, and computer-readable medium configured for indexing records using a hybrid spatial index. The hybrid spatial index is an integer that indicates a spatial location of an object. The method, apparatus, or computer-readable medium may associate an integer spatial index with a record of an object. The integer spatial index indicates a stripe of cells covering the object and encodes two or more of: an indication that the spatial index indicates the stripe of cells, a direction of the stripe, a category of a width of the stripe, the width of the stripe based on the category, a start value of the stripe, or a second dimension of the stripe. The method, apparatus, or computer-readable medium may select the record based on the spatial index being within a range of spatial indices for a spatial predicate.

21 Claims, 12 Drawing Sheets

HYBRID SPATIAL INDEX

CROSS REFERENCE TO RELATED APPLICATION

This application is continuation of U.S. application Ser. No. 18/329,368, filed Jun. 5, 2023, the disclosure of this application are hereby incorporated by reference in its entirety.

BACKGROUND

Spatial information is associated with many types of records. For example, spatial information may include coordinate locations, addresses, and geographic areas such as cities, counties, states, and countries. Records for objects may be associated with spatial information corresponding to the location of the object. Similarly, records for events may be associated with spatial information corresponding to the location of the event. The records may be stored in a database or other information storage such as a data lake or a simple spreadsheet.

Selecting records based on spatial information, however, may not be straight-forward. For example, similar spatial information may be represented in records differently (e.g., as geographic coordinates or the zip-code including the geographic coordinates). Additionally, it may be desirable to select records with spatial information related to a range such as an area. A spatial relational predicate may refer to an expression of spatial information such as an area, boundary, intersection, distance, etc. A spatial predicate may not be directly compared to some representations of spatial information. For example, a database may include addresses, but a query may indicate a spatial predicate of a distance from a coordinate. Such a comparison may require reference to one or more other records to determine comparable representations.

To simplify comparisons of spatial information, a records system may utilize specialized spatial indices that can significantly accelerate those queries involving spatial predicates in comparison to the whole table scan. One of the common spatial data indexing patterns is to represent spatial objects with series of simple covering grid cells (triangles, rectangles, hexagons, etc.), possibly on multiple hierarchical levels that can be mapped to one-dimensional identifiers (e.g., integers) which are simpler for lookup in existing indexing structures, such as B-Trees. Such spatial indices, however, may be limited in the types of information they can represent.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus for indexing data including: one or more memories, individually or in combination, storing computer-executable instructions; and one or more processors coupled to the one or more memories and, individually or in combination, configured to execute the instructions to: associate an integer spatial index with a record of an object, wherein the integer spatial index indicates a stripe of cells covering the object; and select the record based on the spatial index being within a range of spatial indices for a spatial predicate.

In some aspects, the techniques described herein relate to a method of indexing data including: associating an integer spatial index with a record of an object, wherein the integer spatial index indicates a stripe of cells covering the object; and selecting the record based on the spatial index being within a range of spatial indices for a spatial predicate.

In some aspects, the techniques described herein relate to one or more non-transitory computer-readable storage media having stored thereon computer-executable instructions that when executed by one or more processors cause the one or more processors, individually or in combination, to: associate an integer spatial index with a record of an object, wherein the integer spatial index indicates a stripe of cells covering the object; and select the record based on the spatial index being within a range of spatial indices for a spatial predicate.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
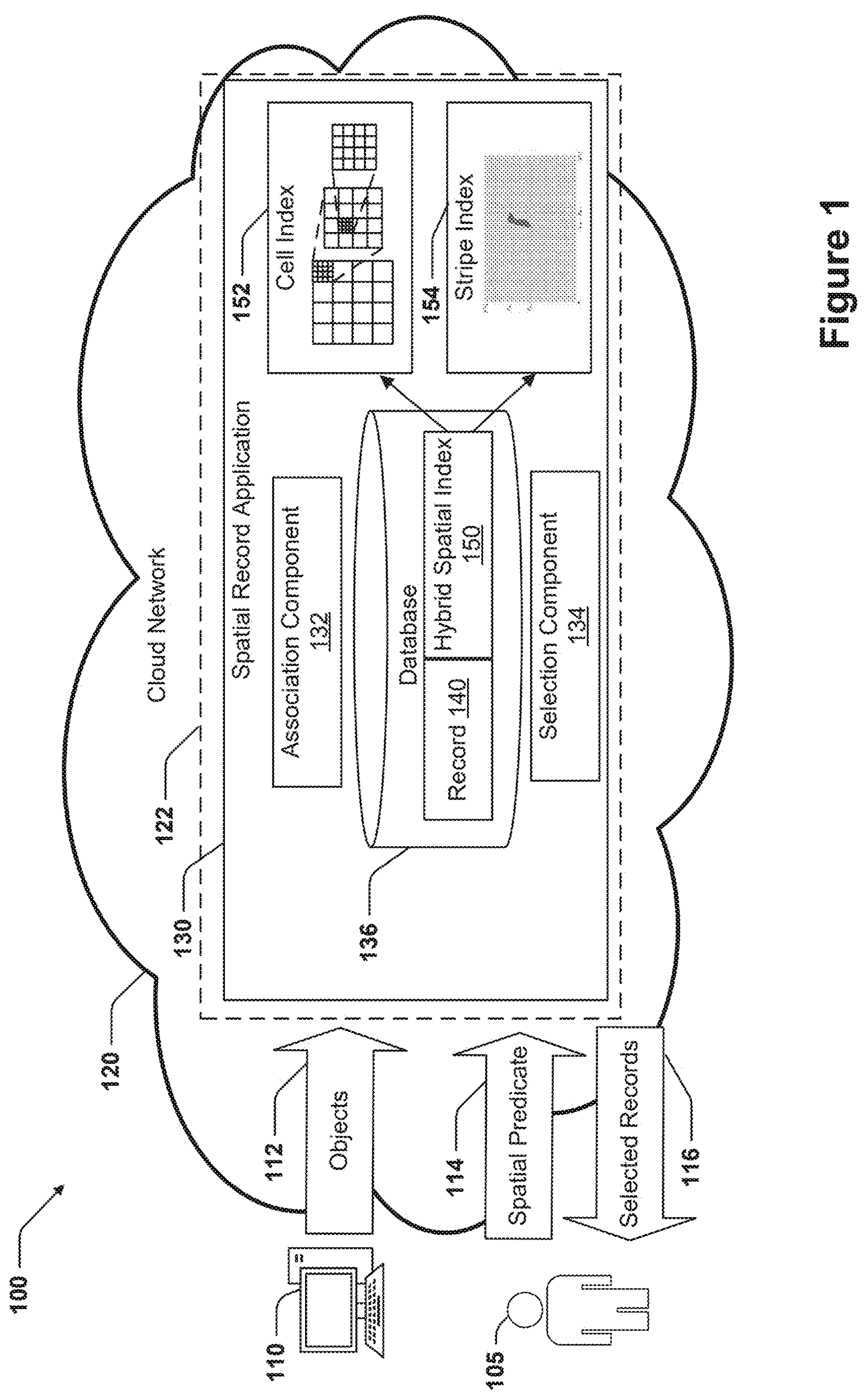
FIG. 1 is a diagram of an example environment for indexing data with a hybrid spatial index, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to hybrid spatial indices. Although conventional spatial indices using hierarchical cells are efficient for indicating points and small areas, such spatial indices may have difficulty representing larger objects. For example, if an object spans two or more of the lowest level cell, the object may be represented by two or more spatial indices. Use of a higher level cell may also be possible, but the higher level cell may include additional lowest level cells, which can result in a false positive selection. Although multiple cells are common for large objects such as roads, bridges, office buildings, etc., because the boundaries of the cells may be essentially arbitrary, even relatively smaller objects may span two or more cells at any level of the hierarchy.

Accordingly, systems using spatial indices based on hierarchical cells may have a one to many mapping between spatial objects and cell identifiers (IDs) resulting in a multi-dimensional index (e.g., a list of cell IDs). A query on such a multi-dimensional index may require joining a secondary record (e.g., the list), filtering for false positive results, and other overheads.

In an aspect, the present disclosure provides for a hybrid spatial index that can represent an object as a single integer such as an integer (5) or bigint data type. The hybrid spatial index may represent either a cell in a hierarchical grid structure or a stripe within a large dimension grid using the same data type. A first bit may indicate which scheme is used. The index, under either scheme, may allow comparisons of the index to a range, which allows an efficient query using a spatial predicate that can be mapped to one or more ranges.

In some implementations, an object may be represented using a cell when a hierarchical level or size of a single cell that includes the object satisfies a threshold (e.g., the single cell is small). For example, a nine-level hierarchy with 16 cells at each level may include $4^9$=262,144 lowest level cells in each dimension. In contrast, objects that are not well-represented by a single cell may be represented by a stripe in a large grid. For example, the grid may have dimensions based on two to the power of a number of bits for representing a starting location of the stripe. In an implementation using an integer(5) datatype of 40 bits, the starting location may be represented by 18 bits resulting in a $2^{18}\times2^{18}$(262,144×262,144) grid. On a global scale, each cell of the grid or each lowest level cell in the hierarchy may correspond to a dimension of approximately 150 meters.

Implementations of the present disclosure may realize one or more of the following technical effects. Use of one dimensional spatial index for data selection of records that can cover more than one cell provides faster selection of records corresponding to a spatial indication. The query may use fewer memory and compute resources, for example, because fewer table joins are used. Encoding of a spatial index based on stripes to use an integer form conserves memory and file size of records and also allows comparison of the spatial index to a range.

Turning now to FIGS. 1-8, examples are depicted with reference to one or more components and one or more methods that may perform the actions or operations described herein, where components and/or actions/operations in dashed line may be optional. Although the operations described below in FIGS. 4-7 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a diagram of an example environment 100 for indexing data with a hybrid spatial index. For example, the environment 100 may include a system 120 that provides a spatial record application 130 that allows a user 105 or computer 110 to access records 140 that are each associated with a hybrid spatial index 150. The system 120 may be, for example, a cloud network including computing resources that are controlled by a network operator and accessible to public clients such as the computer 110 operated by the user 105. For example, the system 120 may include a plurality of datacenters 122 that include computing resources such as computer memory and processors. In some implementations, the datacenters 122 may host a compute service that provides computing nodes on computing resources located in the datacenter. The computing nodes may be containerized execution environments with allocated computing resources. For example, the computing nodes may be virtual machines (VMs), process-isolated containers, or kernel-isolated containers. The nodes may be instantiated at a datacenter 122 and imaged with software (e.g., operating system and applications for a service). The system 120 may include edge routers that connect the datacenters 122 to external networks such as internet service providers (ISPs) or other autonomous systems (ASes) that form the Internet. Alternatively, the application 130 may be executed on a single computer 110 that can be operated by the user 105, or on a server accessible via a network connection. In some implementations, the system 120 may be accessed by multiple users 105 and/or computers 110.

In an implementation, a computer 110 may generate objects 112 for storage as records 140 on the system 120 by the spatial record application 130. For example, the spatial record application 130 may implement a database 136 that stores records 140. Alternatively, the spatial record application 130 may use other types of data storage such as files (e.g., a spreadsheet) or a data lake (e.g., storing JavaScript object notation (JSON) data) for storing records 140. The spatial record application 130 associates a hybrid spatial index 150 with one or more records of an object. For example, the computer 110 may provide data for objects 112 to the spatial record application. The objects may be associated with spatial information. The spatial record application 130 may generate a record 140 including a hybrid spatial index 150 for an object and store the record 140 in the database 136. A user 105 (or computer 110) may query the spatial record application 130 with a spatial predicate 114. The spatial record application 130 may retrieve records that satisfy the spatial predicate 114, and return the results as selected records 116.

In an aspect, the spatial record application 130 includes an association component 132 that is configured to associate an integer spatial index (e.g., hybrid spatial index 150) with a record 140 of an object 112. The integer spatial index indicates a stripe of cells covering the object 112. The spatial record application may be referred to as operating in an index mode when associating the hybrid spatial index 150 with a record 140. The spatial record application 130 includes a selection component 134 that is configured to select the record 140 based on the spatial index (e.g., hybrid spatial index 150) being within a range of spatial indices for a spatial predicate 114. The spatial record application may be referred to as operating in a window mode when selecting records (e.g., within a window defined by the spatial predicate 114).

In an implementation, the spatial index is a hybrid spatial index 150 that can represent either a cell index 152 or a stipe index 154. The hybrid spatial index 150 may use the same integer datatype regardless of whether the hybrid spatial index represents a cell index 152 or a stipe index 154. For example, one bit of the hybrid spatial index 150 may indicate whether the cell index 152 or the stipe index 154 is indicated by the remaining bits. In some implementations, a binary(5) data type including 5 bytes, 10 nibbles (hexadecimal digits), or 40 bits may be used. Some cell indices on existing records may be simply converted to a cell index 152 in the binary(5) data type. In other implementations, a bigint data type of 8 bytes may be used.

Figure 2:
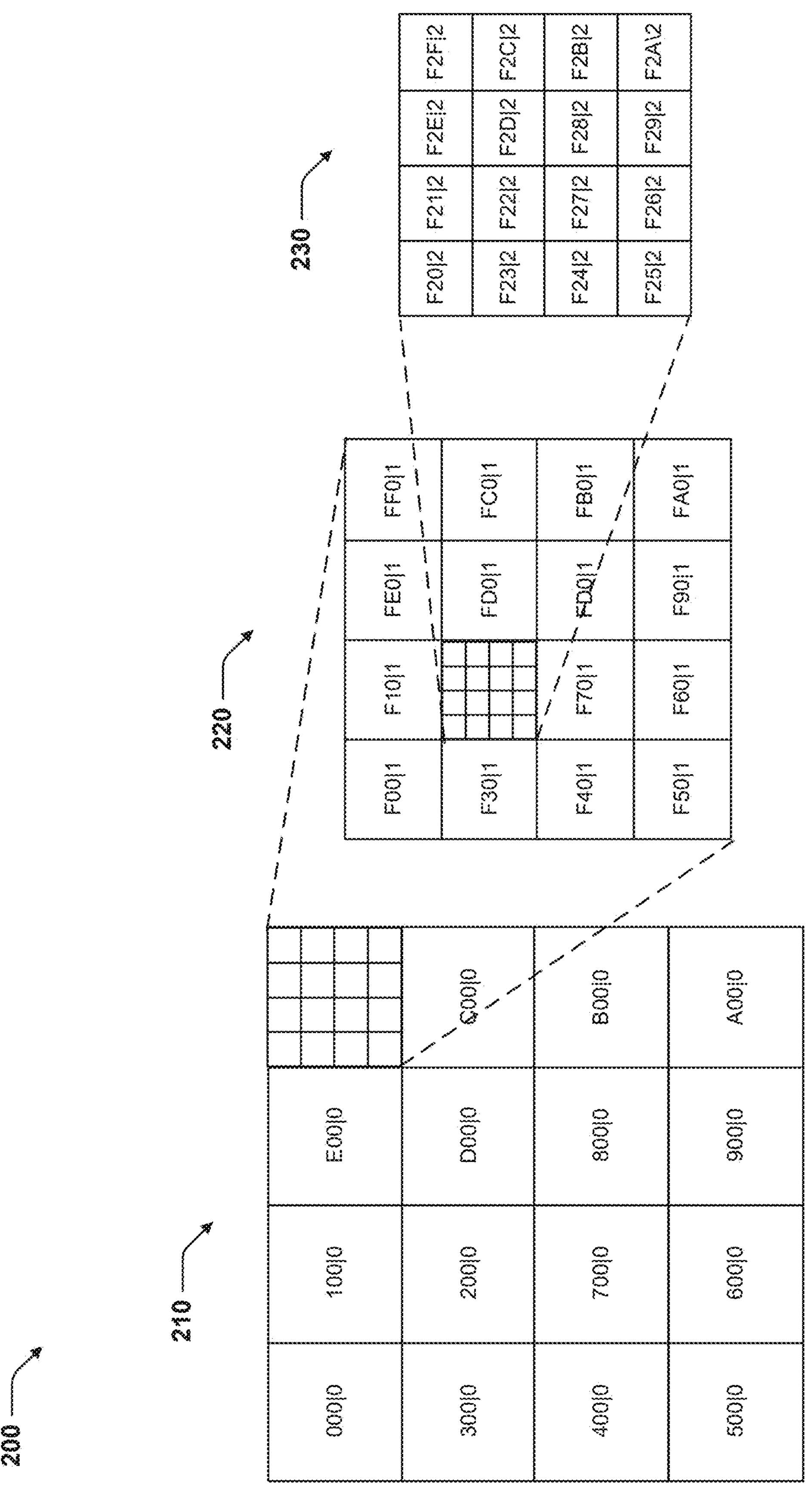
FIG. 2 is a conceptual diagram of an example technique for a spatial index using hierarchical cells, in accordance with aspects described herein.

FIG. 2 is a conceptual diagram 200 of an example technique for a spatial index using hierarchical cells. A location may be represented by a cell index 152 including a series of hexadecimal digits indicating cells and an indication of hierarchical level. A spatial area may be divided into sixteen (16) cells, each cell corresponding to a hexadecimal digit. In some implementations, a Hilbert grid is used to encode the cells.

As illustrated, the diagram 200 includes three (3) hierarchical levels 210, 220, 230. In the first level 210, each cell has a value with the first digit representing the encoded value based on the Hilbert grid and the last digit indicating the hierarchical level. The second level 220 corresponds to the cell F00|0 (or 0xF000). Accordingly, each cell at the level 220 has a value with a first digit "F" representing the cell at the first level, a second digit with an encoded value based on the Hilbert grid, and a last digit representing the hierarchical level 220. The third level 230 corresponds to the cell F20|1 (or 0xF201). Accordingly, at the third level 230, each cell has a value with the first two digits corresponding to the values at the levels 210 and 220, the third digit with an encoded value based on the Hilbert grid. and the last digit indicating the third level 230.

In an aspect, where a cell index 152 is used within the hybrid spatial index 150, the encoding of cells may be modified to include an indication that the index is a grid based index. For example, one bit (e.g., a first bit) may indicate a grid based index. In implementations with up to 8 hierarchical levels, 3 bits may be used to represent the hierarchical level. Accordingly, a binary(5) data type may store 9 nibbles (4 bit hexadecimal values) indicating cells at different hierarchical levels in addition to the indication of the cell index 152 and the hierarchical level. In an implementation, the following expression may be used to encode a cell number (CellNum) as a cell index (CellIndex) e.g., cell index 152 by prepending the indication (0 bit) cell index, shifting the cells one bit to the right, and appending 3 bits indicating the hierarchical level between 2 and 9.

CellIndex=((CellNumX OR 0xF)»1)+min(7,((Cell-Num−2) AND 0xF)

If another integer datatype such as the BigInt type is used, then the mode indication bit can be added as a prefix to existing cell number without any data modifications. Examples herein use the binary(5)=40 bits encoding as a reference for the hybrid spatial index 150 for simplicity, but implementations can be easily adapted to different data types and/or different precision. Additionally, in some implementations, a special "zero" cell may be encoded to indicate that and object is out of the bound of the index. This zero cell can be encoded as 0b 1000 0000 0000 0000 . . . 0000 (or it can be 0x0 in case of BigInt encoding, as there would be no conflicts on it).

A cell index 152 may be convenient for indexing spatial data. The cell index 152 may be simple for lookup in existing indexing structures, such as B-Trees. When querying data indexed with a cell index 152 with a spatial predicate (e.g. intersection), a database system (e.g., spatial record application 130) can calculate all the ranges of cell index 152 ($[a_i,b_i]$, i=1,2, . . . . N) that could happen to be under a spatial shape corresponding to the spatial predicate and select all cells from the index that fulfill $a_i \leq x \leq b_i$ i=1,2, . . . . N as potential results. Some extra filtering is used to separate False Positives from True Positives, but the cell index 152 provides a fast primary selection step.

Figure 3:
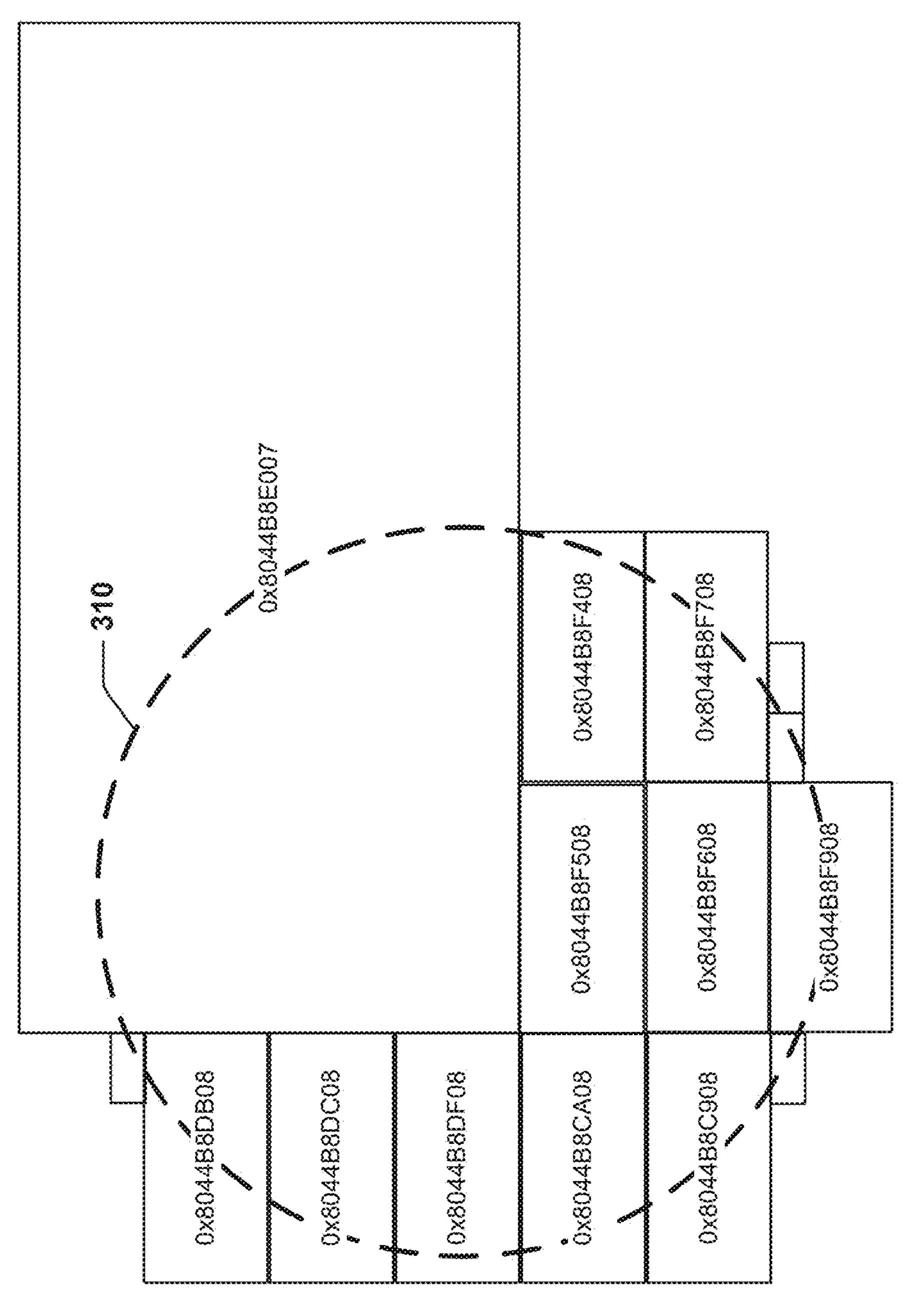
FIG. 3 is a diagram of multiple cells at different hierarchical levels covering an object, in accordance with aspects described herein.

FIG. 3 is a diagram 300 of multiple cells at different hierarchical levels covering an object 310. For example, the object 310 may be a circle that covers multiple cells at the $7^{th}$, $8^{th}$, and $9^{th}$ hierarchical levels.

A cell index 152 may be used with modes of tessellation: index mode and window mode. When a spatial object 310 is being indexed (e.g., a Table Value Function (TVF) call in the "index mode"), a minimal number of non-overlapping cells is selected to cover this object. A table including cell identifiers, the hierarchical level, and a coverage attribute that indicates whether the area covers the cell, intersects the cell, or touches the cell is generated by the TVF. For example, the coverage attribute may indicate whether the object 310 that is being tessellated is: 2—covering cell, 1—intersecting with it, or just 0—touching it. Point data always has a single cell mapping with coverage attribute 1. For larger objects, the number of cells in index mode may be limited to lower values (up to 12 or 16) to contain overall disk usage and maintenance costs because the table is persisted as an additional spatial index table along with mappings to the original data rows and coverage attributes. For example, cells at higher hierarchical levels may be selected first, then split into lower level cells until the limit value is reached. However, identification of cells at higher hierarchical levels may result in more false positives that need filtering during querying.

In the window mode, the same TVF may be used to look up in index which rows intersect with a spatial query window. The TVF is provided with different parameters that will provide search ranges that will cover a specific cell, or both a specific cell and all the nested cells at lower levels of the hierarchy. That is the TVF may output one or more ranges of cell indices 152. There are two types of ranges: [a, a]—ranges containing a single cell and [a, b]—ranges containing base cell (a), and all the nested cells under that cell. The [a,a] ranges are emitted so possible large cells in the index would be selected as well (e.g., when query window object is much smaller than objects in the spatial index). The coverage attribute can be used as a fast True Positive (TP) detection (cell being covered by one object and intersected by the other indicates that objects intersect as well). When calling this TVF in a window mode, a much larger value for the cells_per_object parameter (e.g. 512) may be used, as those values are not being stored anywhere. The larger value provides more efficient filtering in the primary stage. For example, selecting fewer False Positives from the index, and declaring more objects as True Positives due to better coverage attributes will reduce compute overheads during second stage filtering.

As an example, spatial filtering using the cell index 152 may include primary filtering, intermediate filter, and secondary filtering. Primary filtering may include tessellating the spatial shape in query window mode that returns multiple ranges $[a_i, b_i]$, i=1,2, . . . . N. For each cell range from the tessellating, the primary filtering further includes an index seek with condition: $a_i \leq \text{CellId} \leq b_i$ where CellId represents the cell identifiers of the indexed objects (this data is held in internal spatial index table). The primary filtering returns the list of unique primary keys of the base data table that is being indexed along with max sum of coverage attributes coming from spatial index and the query window tessellation calls for that key/row. After this step, all TP results will be returned along with additional rows that might get eliminated in the following steps. At the intermediate filter, for each returned result, if the sum of attributes is larger than 2 (among cells that are common, those cells were covered by one and intersected by the other indexed/querying spatial objects). The intermediate filer may check if Spatial Reference Identifiers (SRID's) are same and return TRUE if they do match. At the secondary filter, for all the returned rows that did not have a sum of attributes larger than 2, the secondary filtering calls the original spatial intrinsic (e.g., STIntersects, STDistance, etc.), in order to make a call if this row should be returned or not.

A cell index 152 may present inefficiencies for both storing and querying such objects that span multiple cells. In the illustrated example, there is a 1 to many mapping between the object 310 and cells because the whole object 310 must be covered by cells in order not to exclude a portion of the object 310. Identification of a single cell to cover the object 310 might not always be possible due to fixed grid alignment, large objects, etc. For instance, an object that spans the boundary between two or more cells at the first level 210 would always be associated with multiple cell indices 152.

In some implementations, the cell index 152 may be stored in a separate structure (e.g., table). This creates multiple compute overheads while performing reverse lookups (from cell to spatial data), especially in analytical storage scenarios which tend to be suboptimal for those "foreign key" lookups. Multiple cells per object mean that cells are being kept in a different table (not in the base data table), which first needs to be filtered using multiple range seeks, then aggregated per unique primary table key, and then joined with primary table to return any kind of results/columns from the base table. If the number of rows being selected is large—a lot of point lookups (seeks) will be needed in the join with data table leading to performance degradation (e.g., slow results). Having to generate a list of distinct primary keys of the base table before fetching any rows from the base table requires aggregation that acts as a stop-and-go operator, causing increased memory usage and a blocking behavior, resulting in unnecessary processing when a query contains the TOP operator or any other selective filters (this is especially problematic in "zoom-out" queries, where spatial predicates select almost the whole table). Most operations such as range index seeks are only supported in row-mode (in SQL Engine), which blocks faster batch mode processing and effective scale-up beyond 8 or 16 cores.

One commonly used alternative to this approach is to limit the number of cells to 1 per spatial object so those cells could be included within same row/table entity with spatial data. Effectively, this can bring significant performance improvements in some scenarios, but the cost is that only point data can be indexed, which may not be acceptable in some scenarios. In an aspect, the hybrid spatial index 150 may use a stripe index 154 in scenarios where the cell index 152 is not efficient.

Figure 4:
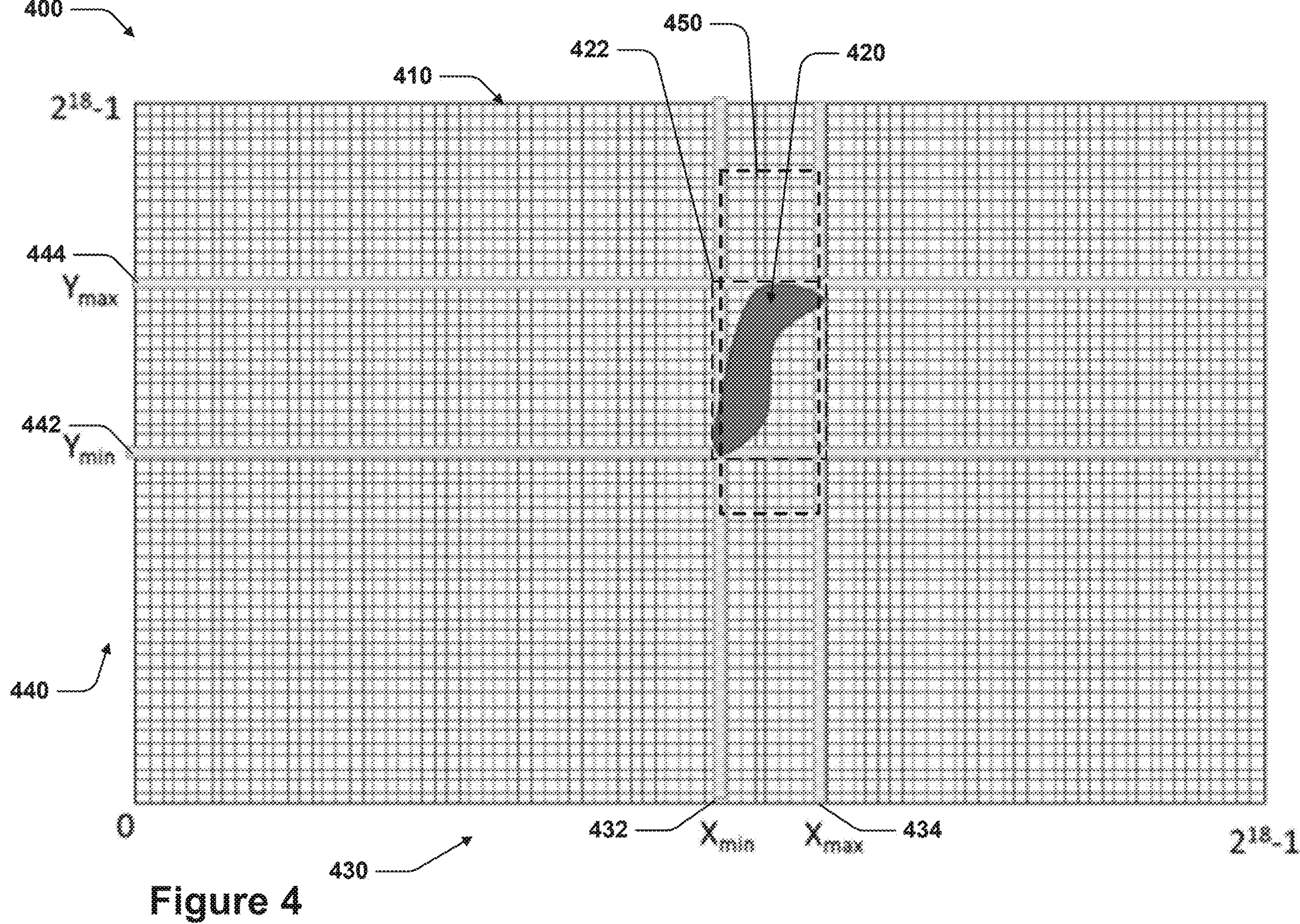
FIG. 4 is a diagram of an example grid for a stripe based spatial index, in accordance with aspects described herein.

FIG. 4 is a diagram 400 of an example grid 410 for a stripe index 154. A stripe index 154 can improve tessellation logic by limiting the number of "cells" that represent the indexed object to 1, so that the hybrid spatial index 150 can be inlined as an additional column of the base table, while still being able to index any kind of spatial object. The single column leads to much better performance as a lot of the overhead operators can be cut out. Further, the stripe index 154 may open multiple new scenarios such as having clustered and non-clustered spatial indexes, and effective indexing in analytical scenarios.

In an aspect, the cell index 152 and the stripe index 154 are combined in a Hybrid Spatial Indexing (Tessellation) scheme, which means combining two different tessellation/encoding methods based on the shape specifics. The primary index lookup would still be of shape $a_i \leq x \leq b_i$ for both indices, so index range seeks could be leveraged, with possibly additional residual filters to further narrow the selection. Cells using different tessellation schemas can have a different prefix bit in both index and window tessellation mode, therefore they would not be mixed in $a \leq x \leq b$ conditions. There would be no overlaps between $[a_i, b_i]$ ranges in window mode, therefore, there will be no need for aggregation of the primary filter results before further filtering. Intermediate and secondary filtering is quite similar with few smaller adaptions (coverage attribute coming from index would always be 1, STContains could leverage intermediate filtering as there is single cell per object and similar).

For indexing mode, objects that fit in a small enough single cell in the cell index 152 are tessellated the same way. Only the common prefix (e.g., indication bit) is being added to them, e.g.: $\text{Id}=0\#a_i \leq \text{CellId}=0\#x \leq \text{LimitId}=0\#b_i$ i=1,2, . . . . N. The remaining objects (e.g., covering more than a threshold size cell) use the stripes encoding that can still be pass through the same range selection expression $\text{Id}=1\#a_i \leq \text{CellId}=1\#x \leq \text{LimitId}=1\#b_i$ i=N+1, . . . . N+M in quite selective manner, without interfering with the rest of ranges. Therefore, the hybrid encoding still complies with $\text{Id} \leq \text{CellId} \leq \text{LimitId}$ primary filtering condition (meaning, no False Negatives), while due to some extra features of those encodings, additional residual filtering on those same inputs is possible.

The grid 410 has a first dimension 430 (e.g., horizontal, x) and a second dimension 440 (e.g., vertical, y). In an aspect, the size of the grid 410 may correspond to a number of bits for storing a starting location of a stripe. For example, the first dimension 430 and the second dimension 440 may be 2 to a power of a number of bits for storing a starting location of the stripe. In an example implementation, 18 bits may be used for storing the starting location of the stripe, so the grid may be $2^{18}\times2^{18}$(262,144×262,144), which may result in the same size cells as 9 hierarchical layers. For illustrative purposes, a smaller portion of the grid 410 is shown.

An object 420 covers multiple cells of the grid 410. As discussed above, a threshold may be used to indicate whether to use a single hierarchical cell index 152 or the stripe index 154 for the object 420. The threshold, for example, may be expressed as a hierarchical level of a single cell to cover the object, or a number of lowest layer cells to cover the object. A relatively small object that spans a border between higher level cells may not satisfy the threshold. When an object 420 does not fit a small enough grid cell (or any grid cell at all) the stipe index 154 is used. The stripe index may include an index indication of a leading "1" which will separate range seeks between cell index 152 and the stripe index 154.

In the indexing mode, to determine the stripe index 154 for the object 420, a bounding box 422 is defined based on minimum and maximum values in each dimension (e.g., $X_{min}$ 432, $X_{max}$ 434, $Y_{min}$ 442, and $Y_{max}$ 444). When defining a stripe based on the bounding box parameters, the spatial record application 130 decides whether horizontal or vertical stripe should be used. For example, selection can be based on relative ratio between width ($X_{max}-X_{min}$) and height ($Y_{max}-Y_{min}$), in which case the spatial record application 130 chooses the smaller value as the primary dimension. Alternatively, a different technique for selecting the efficient encoding (e.g., a formula or machine-learning model) can be used to select the primary dimension. In the illustrated example, a vertical stripe may be selected based on the relatively smaller width.

The association component 132 next encodes the interval [$X_{min}$, $X_{max}$] defining the stripe width with a single CellId value, that would be searchable by using [StartId, LimitId] range values. In an implementation, the following table may be used to select the width category.

TABLE 1

Stripe width category encoding

| Width Category | Max Width | Bits Used for Width Encoding | Encoded Value |
|---|---|---|---|
| 0 | 4(0-3) | 2 | 00 |
| 1 | 16(0-15) | 4 | 01 |
| 2 | 256(0-255) | 8 | 10 |
| 3 | 2^18 | 8 (rounding) | 11 |

When encoding stripe in index mode, category information bits are appended before the actual starting position (e.g., $X_{min}$). As noted in the table, the width category affects the number of bits for encoding the width. The last width category (which is applicable to only large stripes), rounds the actual width to the nearest 8 bit representation (e.g., the 8 most significant bits of $X_{max}-X_{min}$).

The association component 132 next encodes a secondary dimension based on the number of available bits for secondary dimension encoding (i.e., remaining bits based on width category). The association component 132 looks for the smallest stripe length that fits the object on the secondary dimension. In some implementations, the following interval encoding in Table 2 encodes a length and offset.

TABLE 2

Sample encoding logic for 8-bit stripe length and position encoding

| Stripe Length | Offset Count | Encoding |
|---|---|---|
| $½^0$ | 1 | 0b111110X |
| $½^1$ | $2^2$ | 0b111110XX |
| $½^2$ | $2^3$ | 0b11110XXX |
| $½^3$ | $2^4$ | 0b1110XXXX |
| $½^4$ | $2^5$ | 0b110XXXXX |
| $½^5$ | $2^6$ | 0b10XXXXXX |

Figure 5:
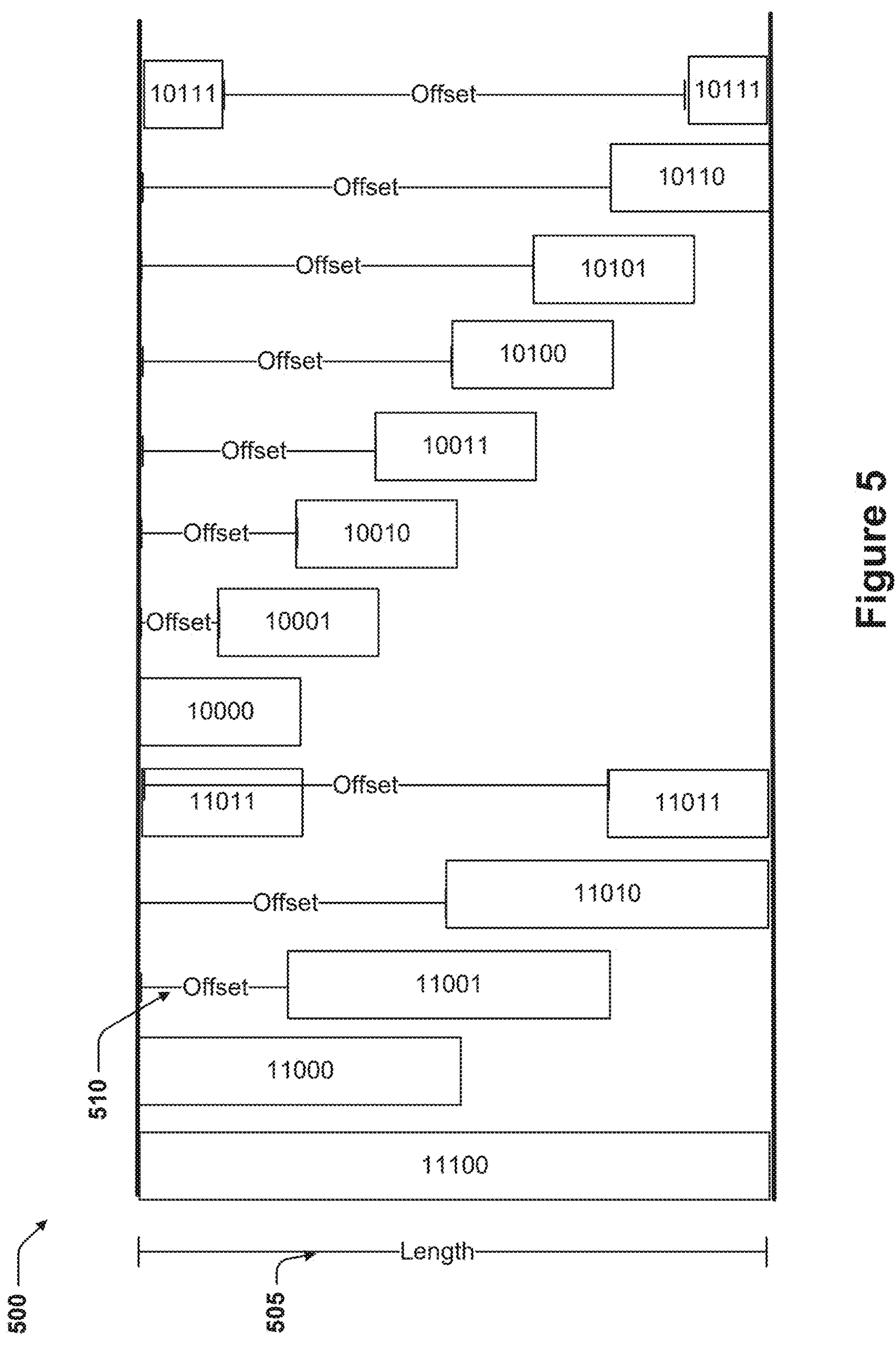
FIG. 5 is a diagram of example encodings of a secondary dimension for a stripe based spatial index.

FIG. 5 is a diagram 500 of example encodings of a secondary dimension for a stripe. For illustrative purposes, the example is based on a spatial index with 5 bits for encoding the second dimension, but the same pattern can be applied to a larger number of bits. Similar to the 8-bit index in Table 2, the 5-bit index includes bits indicating a stripe length, and the remaining bits indicating an offset 510. For example, the 5-bit index may be used with width categories 2 and 3, where 8 bits are used to encode the stripe width. As illustrated the values 1011 and 0111, cross a beginning/end of the window. These split stripes may be used for objects crossing an antemeridian in geography encoding.

In an implementation, a stripe index 154 may be given in the following binary format: 0b11DC C1XXX X XX XXXX WW (SS SSSS|WW SSSS|WW WWWW) SSSS SSSS. The 11 is an indicator of the stripe index 154 as opposed to cell index 152. The D bit indicates the primary stripe direction (e.g., 0=horizontal and 1=vertical). The two CC bits indicate the stripe width category (e.g., according to Table 1). The 18 X bits indicate the ID of the stripe start value. The use of the same size cell resolution for cell index 152 and stripe index 154 allows similar constants and variables to be defined for both indices. The W bits encode the width value. The number of W bits and encoding is based on the stripe width category as in Table 2. The S bits encode the length of the stripe and position of the stripe in the secondary dimension. The number of S bits is based on the number of W bits (e.g., 16 minus the number of W bits). Encoding is of a shape 111 . . . 110FFF, where Fs encode offset of the interval in the second dimension, and number of 1's (N) represents the scale/size of individual intervals (e.g., as in Table 2 and FIG. 5).

Window mode uses a stripe index 154 of the same format as the index mode, but generates multiple stripes and adjusts some parameters to be more inclusive (e.g., to avoid false negatives). In window mode, one pair of horizontal and vertical stripes $$\left[W_{min} - \mathrm{Max}Width^{cat(i)},\ W_{max}^{cat(i)}\right]$$

will be emitted per width category with a same prefix scheme. The direction bit and the width category bits distinguish the stripes, so values from different categories will not overlap. The range for the stripes is based on the maximum width of a stripe for the category, so only $X_{min}$ or $Y_{min}$ is used for the range check (not the actual dimension of the window or spatial predicate.)

In the window mode, the selection component 134 emits one pair of [StartId, LimitId] values per width category, that would accommodate for worst case width within that category. Therefore, original expression for checking if intervals [$X_{min}$, $X_{max}$] and [$W_{min}$, $W_{max}$] intersect starts with:

$W_{min} \leq X_{max}$ and $X_{min} \leq W_{max}$ $W_{min} - X_{width} \leq X_{max} - X_{width}$ and $X_{min} \leq W_{max}$ $W_{min} - X_{width} \leq X_{min} \leq W_{max}$ The parameter $X_{width}$ can be eliminated by replacing it with MaxWidth(WidthCategory($X_{width}$)), which is greater than $X_{width}$, so expression becomes:

$$StartId^{cat(i)} = W_{min} - \mathrm{Max}Width^{cat(i)} \leq X_{min}^{cat(i)} = CellId^{cat(i)} \leq W_{max}^{cat(i)} = LimitId^{cat(i)}$$

In an implementation, the StartID can be expressed as:

0b11DC CIYY YYYY YYYY YYYY YYYY 00 (KK KKKK|00 KKKK|00 0000) KKKK KKKK

The 11, D bit, and C bits are the same as in indexing mode. The Y bits indicate a minimum starting value of a stripe that could intersect the spatial object. The Y bits indicate the maximal width that width category of an object can cover, as only objects not satisfying $IdxObj_{min}$+$IdxObj_{Width} \leq QueryObj_{min}$ should be eliminated. The 1 bit before the Y bits is used as a prefix to ensure the value is not larger than LimitID due to modulo-2 arithmetic. Therefore, the selection component 134 calculates Y as $QueryObj_{min}$−$MaxWidth^{cat(i)}$ to obtain a discrete value for the Y bits. The 0 bits in the StartID include 2, 4, or 8 bits, depending on width category to accommodate for any width. Adding those zeros will make sure that this value is always smaller or equal than smallest indexed value that falls into this category, as width of indexed stripe value will always be 0 or more. The StartID includes 8 to 14 bits to limit/encode the secondary dimension and position of the stripe. Encoding is of shape 000 . . . 001FFF, similar to the S bits in index stripe encoding, where F's represent the offset of the interval and number of 0s represent the scale/size of the interval.

The LimitID can be expressed as:

0b11DC C1ZZ ZZZZ ZZZZ ZZZZ ZZZZ 1111 1111 1111 1111

The 11, D bit, and C bits are the same as in indexing mode. The Z bits represent a maximum value of the primary dimension for a stripe. The 1 bit before the Z bits is a prefix similar to the StartID. For the CellID≤LimitID inequality, the LimitID eliminates objects that start after the query window ends. Therefore, the Z bits are based on the maximum value of window or spatial predicate, $QueryObj_{max}$.

The primary filter for window mode compares the single hybrid spatial index 150 for each record to the window of the spatial predicate (e.g., another bounding box) using the emitted ranges of stripes. With StartID, CellID and LimitID defined this way, expression StartID≤CellID≤LimiID performs relatively selective filtering based on direction and worst-case width assumption within selected width category. The comparison may be a simple comparison of the integer values for each of the defined ranges. Accordingly, the primary filtering can be performed without joining any additional tables.

Additional filtering can be performed on the same parameters by introducing a residual filter FCheckCellRange (CellID, StartID, LimitID), which extracts additional encoded values from those parameters and improves primary range filtering from $QueryObj_{min}$−MaxWidth(WidthCategory)≤$IdxObj_{min}$ to $QueryObj_{min}$−$IDxObj_{width}$≤$IDxObj_{min}$ with additional disjunction check based on the secondary dimension encoding. In the case of the regular grid cell, this intrinsic would result in no operation.

Figure 6:
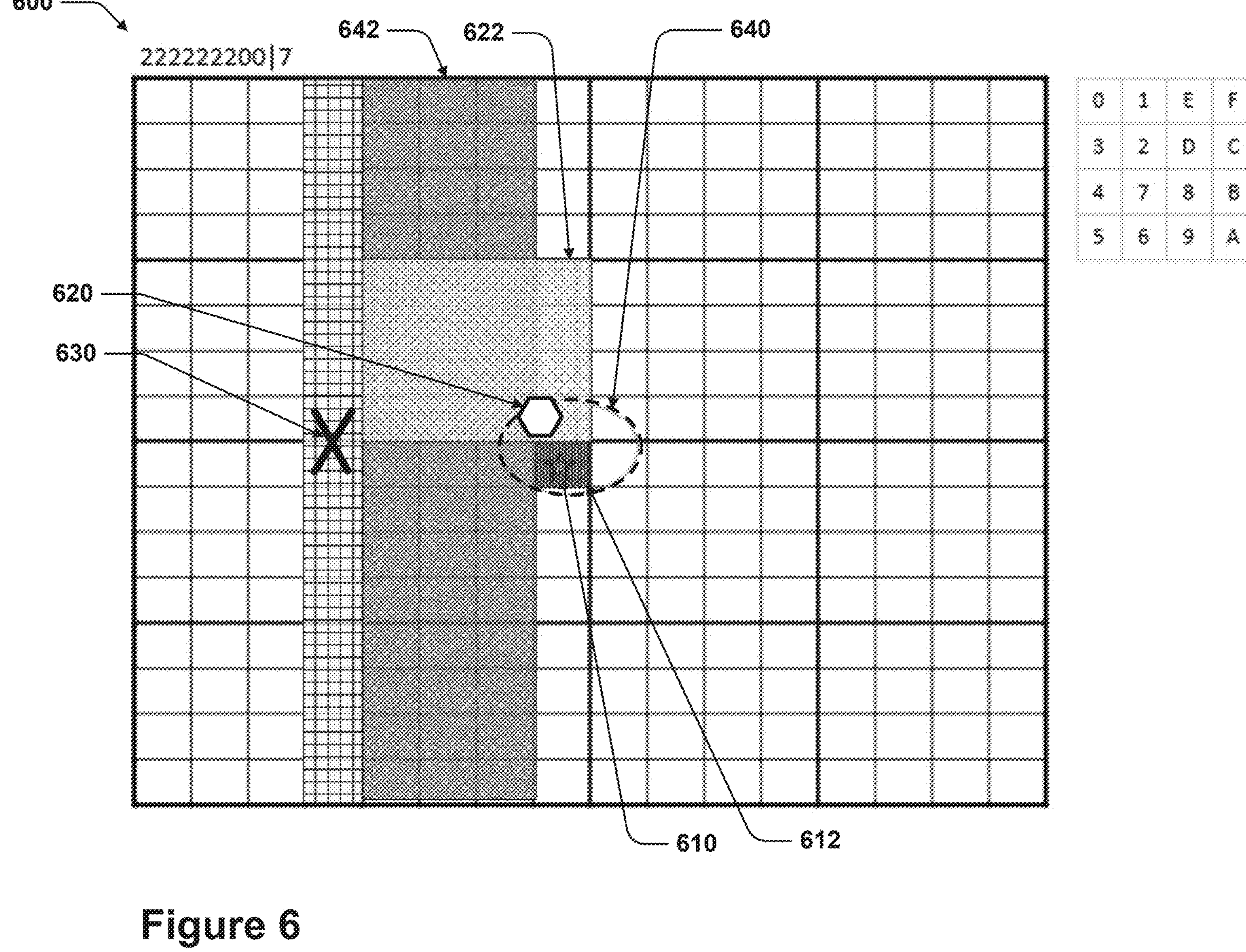
FIG. 6 is a diagram of example objects indexed with a hybrid spatial index and a spatial predicate for querying records of the objects, in accordance with aspects described herein.

FIG. 6 is a diagram 600 of example objects indexed with a hybrid spatial index and a spatial predicate for querying records of the objects. The location of all objects is within a cell (e.g., 222222200|7) at a $7^{th}$ hierarchical layer, so only the $8^{th}$ and $9^{th}$ hierarchical layers within that cell are shown. The example objects include a star 610, a hexagon 620, and an X 630. A query may use a spatial predicate that defines an ellipse 640.

The star 610 fits the single cell 612 on $9^{th}$ level of tessellation: 22222227F|9, therefore the association component 132 will use the cell index 152 for encoding this object as: Binary(5): T(0x22 2222 27F9)=0x22 2222 27F0»1+7=0x11 1111 13FF. For cell based encoding, the index indication bit (value 0 for hierarchical cells) is prepended to the cell identifier, bits 39 . . . 4 indicating cell IDs on each hierarchical level are shifted to the 38 . . . 3 positions, and hierarchical level (9) is subtracted by 2 (minimal hierarchical level being used) and encoded with last three bits: 2 . . . 0. In this example, the cell identifiers (0x2=0b0010), when shifted right one bit become (0x1=0001). The hierarchal level (8) is encoded over the last three bits (0b1111=0xF).

The hexagon 620 spans the border of the $9^{th}$ level cells, but still fits a single cell 622 on the $8^{th}$ level: 222222220|8. If the threshold for stripe index 154 is hierarchical level 7, the hexagon 620 may not satisfy the threshold and may be encoded using a cell index 152 as: Binary(5): T(0x22 2222 2208)=0x22 2222 2200»1+6=0x11 1111 1106.

The X 630 crosses the border of both $9^{th}$ and $8^{th}$ level cells, so the first cell that would fit the X 630 would be the parent cell 222222200|7. With the threshold of hierarchical level 7, using that big of a cell would be less efficient than using a stripe index. For instance, a $7^{th}$ level cell includes 256 $9^{th}$ level cells, while the smallest stripe is 128 $9^{th}$ level cells in size. Accordingly, the X 630 may be encoded with a stripe index 154. The association component 132 may use a vertical stripe 632 (since $X_{width}$<$Y_{width}$), so D=1. Since the width of the X 630 is less than one cell, the category is the minimal category 0, so CC=00. For the stripe starting point, the $X_{min}$ corresponding to cell 22 2222 223A|9or 22 2222 2234F|9 is 87379n=0x1 5553 (18 bits). The stripe width of less than 1 cell based on category 0 is encoded as WW=00. Because 2 bits are used for WW, the secondary dimension (S-bits) can use 14 bits. The stripe height is only 2 cells, so the minimum height can be indicated with a leading 10 corresponding to a height of 128 cells. The remaining 12 bits can encode the offset, which for 12 bits may be $Y_{min}/2^{18-12}$=174759/$2^6$=2730. Accordingly, the stripe 632 for the X 630 may be encoded as a stripe index 154 with a value of:

binary(5): 0b 11 1 00 1 010101010101010011 00 10101010101010 or 0x E5 5553 2AAA

When the ellipse 640 is used in window mode to query records based on the hybrid spatial index 150, the selection component 134 may first emit a StartID and a LimitID for cells to cover the ellipse 640. The selection component 134 may indicate an attribute associated with each range of [StartID, LimitID]. For instance, the emitted cells may include the 9 cells overlapping the ellipse 640 at the $9^{th}$ hierarchical level, and the 4 cells overlapping the ellipse 640 at the $8^{th}$ hierarchical level. In some implementations, the emitted cells may include the 1 cell at each of hierarchical levels 2 through 7, but these cells may not be needed where cell encoding is not used for these hierarchical levels.

For stripe based encodings of the ellipse 650, the selection component 134 may emit all the stripes (e.g., window stripe 642) that could capture overlapping index objects. Input parameters needed for the creation of window stripes 642 come from bounding box of the window object: $X_{min}$=87382; $X_{max}$=87384; $Y_{min}$=174758; and $Y_{max}$=174760. In an implementation, 8 stripes corresponding to all combinations of direction D and width category CC are emitted.

As an example, a vertical stripe (D=1) with the minimum width category may use two bits for maximum stripe width (11), 18 bits for the primary start location, and 14 bits for the secondary dimension. The primary start location for the window stripe 642 for the ellipse 640 corresponding to e.g., cell 22222227F may be encoded as:

$$Y_s = W_{min} - \mathrm{Max}Width^{cat(0)} = 87382 - 3 = 87379$$

For the StartID, the secondary dimension encoding for the height of the ellipse may be similar to the secondary dimension encoding of the X for the index mode, but with the stripe length bits inverted. Inverting the stipe length bits may ensure that the StartID≤CellID for encoding of the same spatial object. Accordingly, the StartID for the stripe may be:

binary(5): 0b 11 1 00 1 010101010101010011 00 01101010101010; or 0x E5 5553 1AAA The LimitID for the stripe may be:

binary(5): 0b 11 1 00 1 010101010101011000 1111111111111111; or 0x E5 5558 FFFF

When filtering for each of the shapes, the CellID for the shape is compared to each of the emitted ranges for both the cell index 152 and the stripe index 154 using the inequality StartID≤CellID≤LimitID. For the star 610, the CellID satisfies the inequality for the corresponding single $9^{th}$ level cell 612: 0x11 1111 13FF≤0x11 1111 13FF≤0x11 1111 13FF. Similarly, for the hexagon, the CellID satisfies the inequality for the corresponding single $8^{th}$ level cell 622: 0x11 1111 1106≤0x11 1111 1106≤0x11 1111 1106.

For the X 630, the inequality for the primary filter based on the window stripe 642 is also satisfied: 0xE5 5553 1AAA≤0xE5 5553 2AAA≤0xE5 5558 FFFF The filter may also check the real width and the secondary dimension. For cell index 152, these checks may be pass-through, so the star 610 and hexagon 620 pass. For the X 630, the real width check:

$$W_{min} = Y_s + \mathrm{Max}Width^{cat(0)} = (0 \times E5\ 5553\ 1AAA\ \&\ 0 \times 3\ FFFF\ 0000) \gg 16 + 3 = 87382n$$

$$W_{max} = Z_s = (0 \times E5\ 5558\ FFFF\ \&\ 0 \times 3\ FFFF\ 0000) \gg 16 = 87384n$$

$$X_{min} = X_s = (0 \times E5\ 5553\ 2AAA\ \&\ 0 \times 3\ FFFF\ 0000) \gg 16 = 87379n$$

$$X_{max} = X_s + Ws = X_{min} + 0 = 87379n$$

$$W_{min} \le X_{max} \text{ and } X_{min} \le W_{max} = \text{False and True} = \text{False}$$

For the secondary dimension intersection check of X 630:

$$(Y_{min}, Y_{max}) = f(S_s) = f(0 \times E5\ 5553\ 2AAA\ \&\ 0 \times 3FFF) = f(0b10101010101010) = (2730n * 128n,\ 2730n * 128n + 127n) = (349\ 440{,}349\ 567)$$

-continued $$(W'_{min}, W'_{max}) = f(K_s) = f(0 \times E5\ 5553\ 1AAA\ \&\ 0 \times 3FFF) = f(0b01101010101010) = (2730n * 128n,\ 2730n * 128n + 127n) = (349\ 440{,}349\ 567)$$

$$W'_{min} \le Y_{max} \text{ and } Y_{min} \le W'_{max} = \text{True and True} = \text{True}$$

In this example, the real width check is not passed for the X 630, so the X 630 is discarded from the query results.

In some implementations, in the follow up processing (e.g., intermediate filter and secondary filter), the star 610 is qualified as True Positive at the intermediate filter because the windows cell coverage attribute was 2 (and the indexed object coverage attribute is considered to always be 1). The hexagon 620 object has to pass the secondary filter (geometry intersection check) for a final decision to determine whether the hexagon 620 actually intersects with the ellipse 640.

Figure 7:
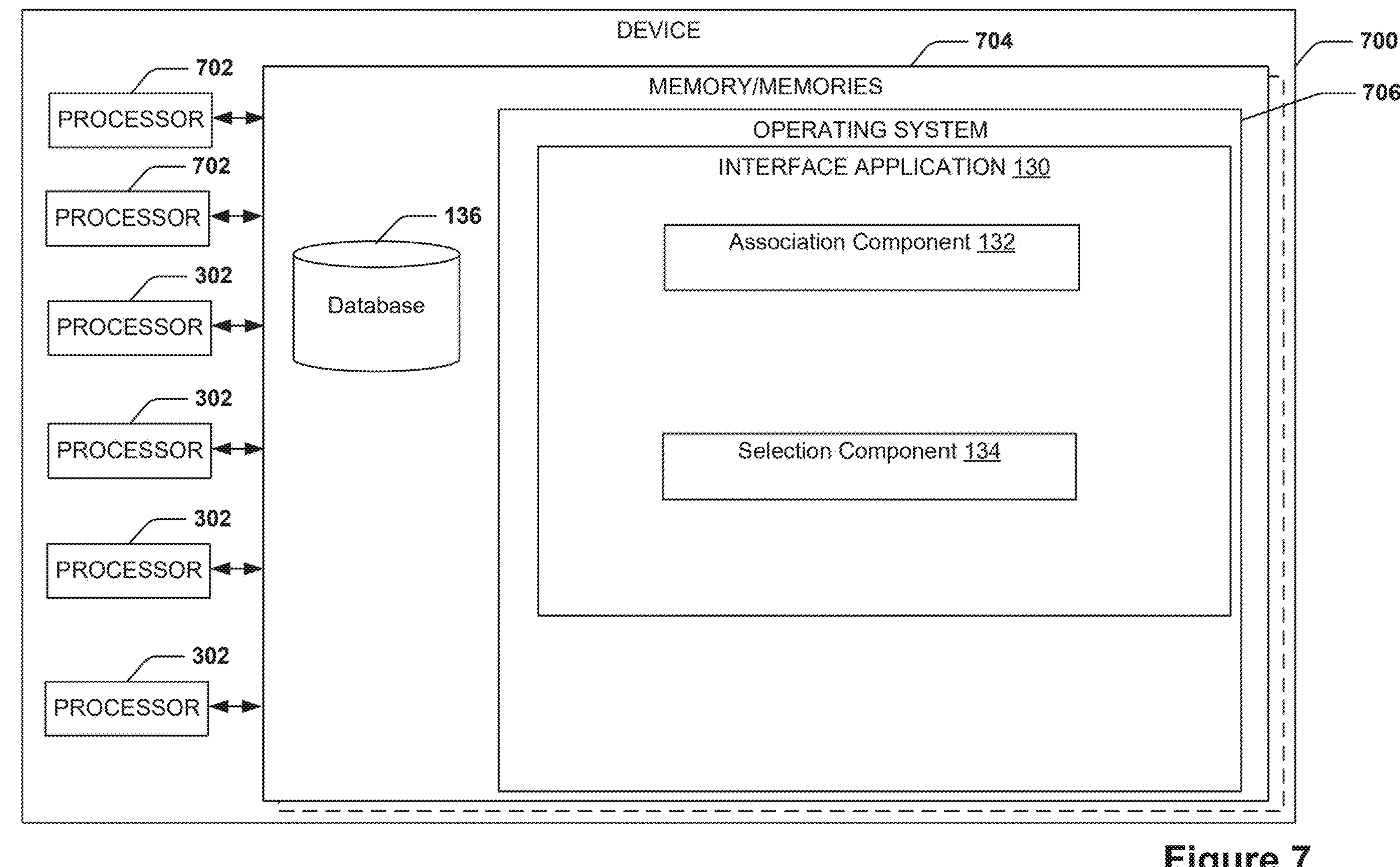
FIG. 7 is a diagram of an example computer device for indexing data with a hybrid spatial index.

FIG. 7 is a diagram of an example apparatus 700 (e.g., a computing device) for indexing data with a hybrid spatial index 150. The apparatus 700 may be implemented as one or more computing devices in the system 120.

In an example, the apparatus 700 includes one or more processors 702 and one or more memories 704 configured to execute or store instructions or other parameters related to providing an operating system 706, which can execute one or more applications or processes, such as, but not limited to, the spatial record application 130. For example, processors 702 and memory/memories 704 may be separate components communicatively coupled by a bus (e.g., on a motherboard or other portion of a computing device, on an integrated circuit, such as a system on a chip (SoC), etc.), components integrated within one another (e.g., a processor 702 can include a memory 704 as an on-board component), and/or the like. Memory/memories 704 may store instructions, parameters, data structures, etc. for use/execution by the one or more processor(s) 702, individually or in combination, to perform functions described herein. In some implementations, the memory/memories 704 includes the database 136 for use by the spatial record application 130.

In an example, the spatial record application 130 includes the association component 132 and the selection component 134 discussed above with respect to FIG. 1.

In some implementations, the apparatus 700 is implemented as a distributed processing system, for example, with multiple processors 702 and memories 704 distributed across physical systems such as servers, virtual machines, or datacenters 122. For example, one or more of the components of the spatial record application 130 may be implemented as services executing at different datacenters 122. The services may communicate via an API.

Figure 8:
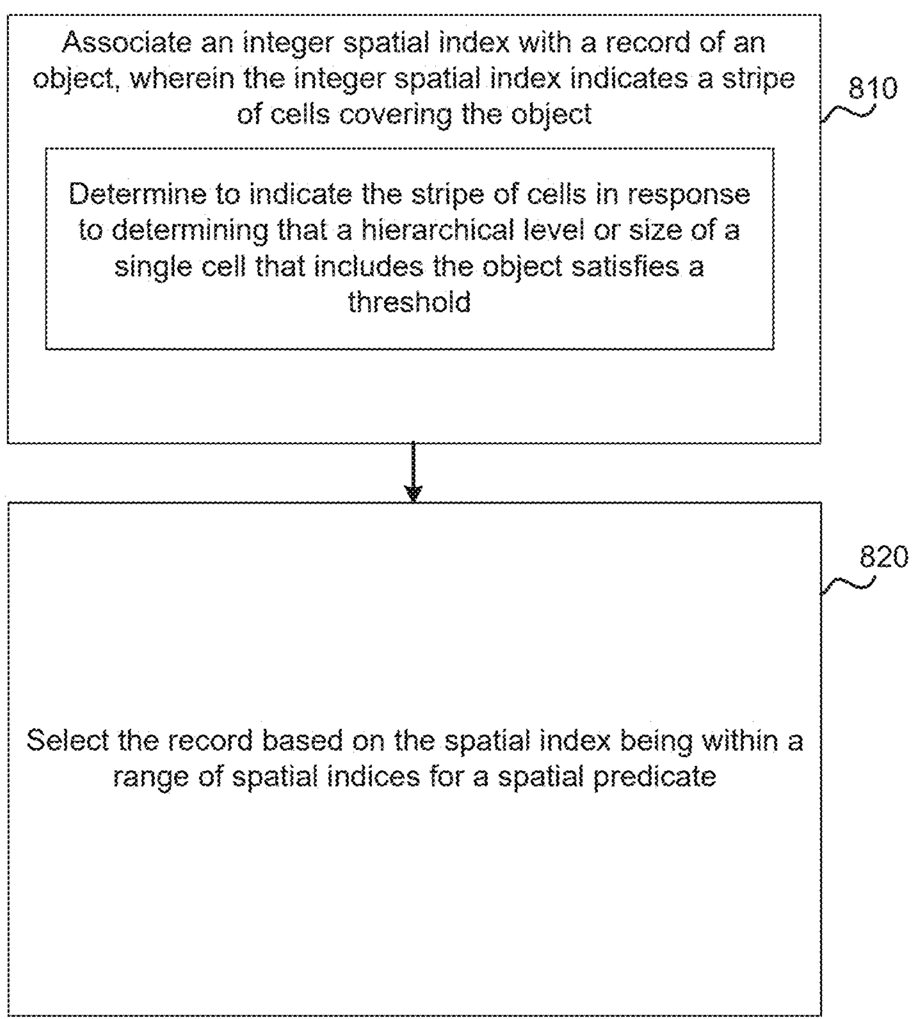
FIG. 8 is a flow diagram of an example method of indexing data with a hybrid spatial index, in accordance with aspects described herein.

FIG. 8 is a flow diagram of an example of a method 800 of indexing data with a hybrid spatial index. For example, the method 800 can be performed by the spatial record application 130, the apparatus 700 and/or one or more components thereof to index a record 140 with a hybrid spatial index 150.

At block 810, the method 800 includes associating an integer spatial index with a record of an object, wherein the integer spatial index indicates a stripe of cells covering the object. For example, in an aspect, apparatus 700, processor(s) 702, memory/memories 704, spatial record application 130, and/or association component 132 may associate an integer spatial index (e.g., hybrid spatial index 150 or stripe index 154) with a record 140 of an object 112.

The integer spatial index indicates a stripe 450 of cells covering the object 420. In some implementations, at sub-block 812, the block 810 optionally includes determining to indicate the stripe of cells in response to determining that a hierarchical level or size of a single cell that includes the object satisfies a threshold. For example, the threshold may be a minimum number of cells in a stripe or a hierarchical level where each cell includes a number of lowest level cells greater than the minimum number of cells in the stripe. Further optional details of block 810 are described with respect to FIG. 9.

At block 820, the method 800 includes selecting the record based on the spatial index being within a range of spatial indices for a spatial predicate. For example, in an aspect, apparatus 700, processor(s) 702, memory/memories 704, spatial record application 130, and/or selection component 134 select the record 140 based on the spatial index being within a range of spatial indices for a spatial predicate 114. Further optional details of block 820 are described with respect to FIGS. 10-12.

Figure 9:
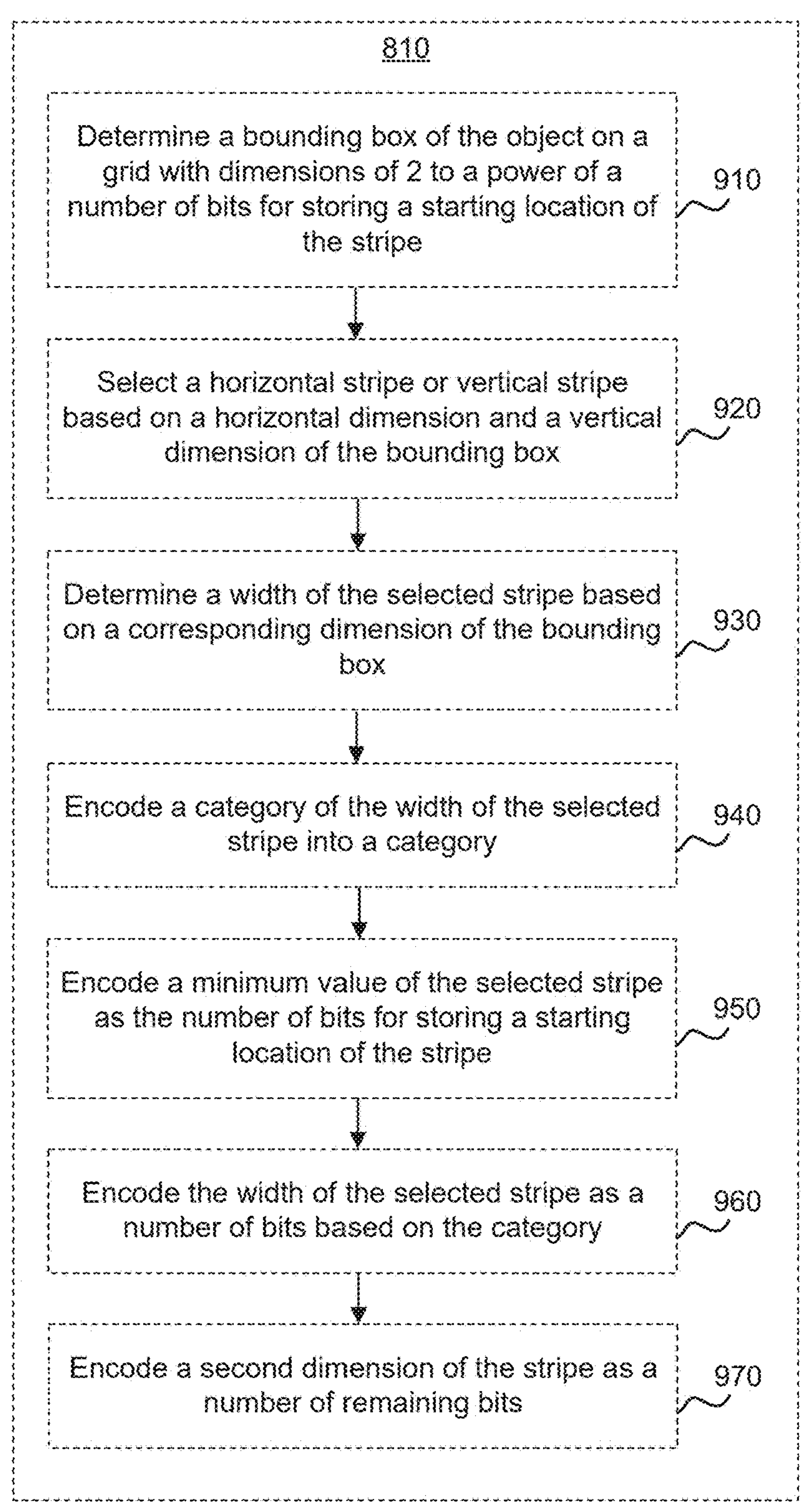
FIG. 9 is a flow diagram of an example method of associating a stripe index with a record, in accordance with aspects described herein.

Referring to FIG. 9, in an alternative or additional aspect, at block 910, the associating the integer spatial index with the record of the object at block 810 may include determining a bounding box 422 of the object 420 on a grid 410 with dimensions (e.g., first dimension 430 and second dimension 440) of 2 to a power of a number of bits for storing a starting location of the stripe 450. For example, the bounding box 422 may be defined based on the $X_{min}$ 432, $X_{max}$ 434, $Y_{min}$ 442, and $Y_{max}$ 444 of the object 420.

In this optional aspect, at block 920, the associating at block 810 includes selecting a horizontal stripe or vertical stripe based on a horizontal dimension and a vertical dimension of the bounding box. For example, the association component 132 may select either a horizontal stripe or vertical stripe based on which dimension of the bounding box 422 is smaller.

In this optional aspect, at block 930, the associating at block 810 includes determining a width of the selected stripe based on a corresponding dimension of the bounding box. For example, the width of the selected stripe may be determined as $X_{max\ 434}-X_{min}$ 432 or $Y_{max}$ 444$-Y_{min}$ 442.

In this optional aspect, at block 940, the associating at block 810 includes encoding a category of the width of the selected stripe into a category. For example, the category of the width (e.g., CC bits) of the selected stripe may be encoded according to Table 1 or another definition of width categories.

In this optional aspect, at block 950, the associating at block 810 includes encoding a minimum value of the selected stripe as the number of bits for storing a starting location of the stripe. For example, the association component 132 may encode the value of $X_{min}$ 432 or $Y_{min}$ 442 over the number of bits defining the dimensions of the grid 410.

In this optional aspect, at block 960, the associating at block 810 includes encoding the width of the selected stripe as a number of bits based on the category. For example, the association component 132 may encode the width ($X_{max}$ 434$-X_{min}$ 432) of the selected stripe 450 as a number of bits based on the category according to Table 1 or another definition of width categories.

In this optional aspect, at block 970, the associating at block 810 includes encoding a second dimension of the stripe as a number of remaining bits. For example, the association component 132 may encode the second dimension of the stripe 450 as a number of remaining bits, for example, based on Table 2 or a similar definition. For instance, the encoding of the second dimension may indicate a stripe length 505 and an offset 510.

Figure 10:
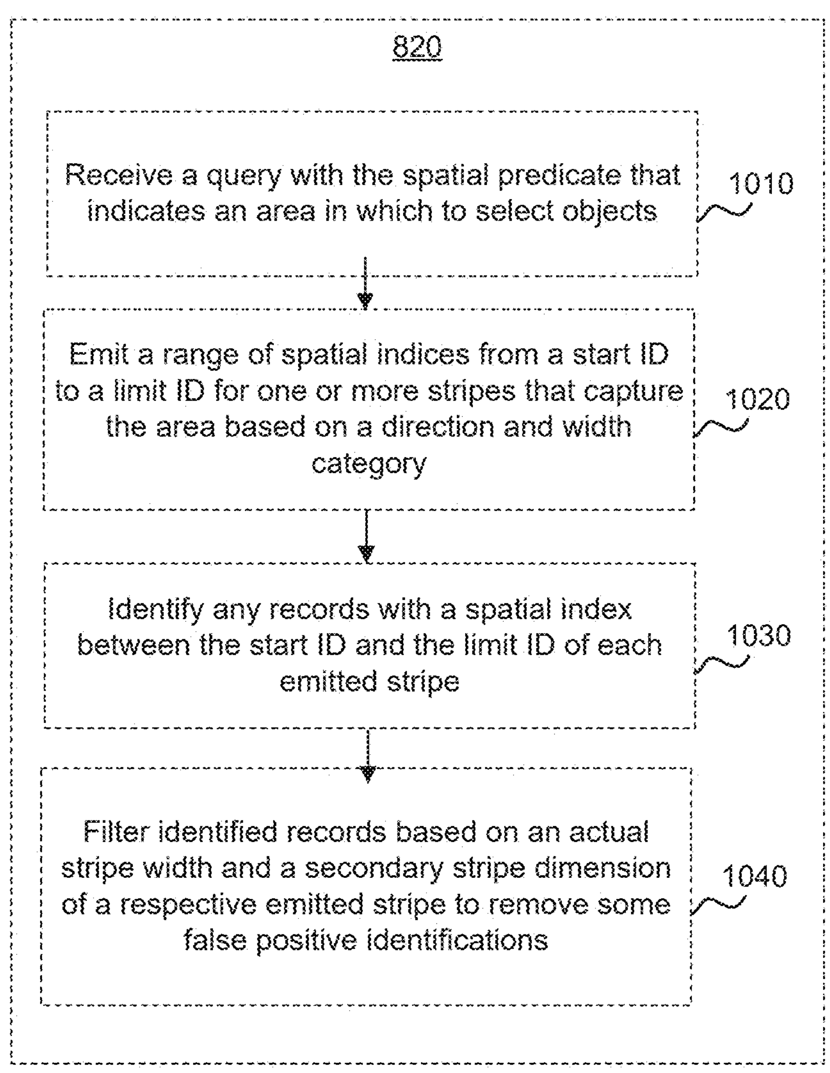
FIG. 10 is a flow diagram of an example method of selecting records based on a stripe index, in accordance with aspects described herein.

Referring to FIG. 10, in an alternative or additional aspect, at block 1010, the selecting the record based on the spatial index being within a range of spatial indices for a spatial predicate at block 820 may include receiving a query with the spatial predicate that indicates an area in which to select objects. For example, the selection component 134 may receive a query with the spatial predicate 114 that indicates an area (e.g., ellipse 640) in which to select objects 112, 420.

In this optional aspect, at block 1020, the selecting at block 820 may include emitting a range of spatial indices from a start ID to a limit ID for one or more stripes that capture the area based on a direction and width category. For instance, the selection component 134 may emit a range of spatial indices (e.g., stripe index 154) from a start ID to a limit ID for one or more stripes 450 that capture the area (e.g., ellipse 640) based on a direction (e.g., D bit) and width category (e.g., CC bits).

In this optional aspect, at block 1030, the selecting at block 820 may include identifying any records with a spatial index between the start ID and the limit ID of each emitted stripe. For instance, the selection component 134 may identify any records 140 with a spatial index (e.g., hybrid spatial index 150 or stripe index 154) between the start ID and the limit ID of each emitted stripe.

In this optional aspect, at block 1040, the selecting at block 820 may include filtering identified records based on an actual stripe width and a secondary stripe dimension of a respective emitted stripe to remove some false positive identifications. For instance, the selection component 134 may filter identified records based on an actual stripe width and a secondary stripe dimension of a respective emitted stripe to remove some false positive identifications. Further details of block 1040 are described with respect to FIG. 11.

Figure 11:
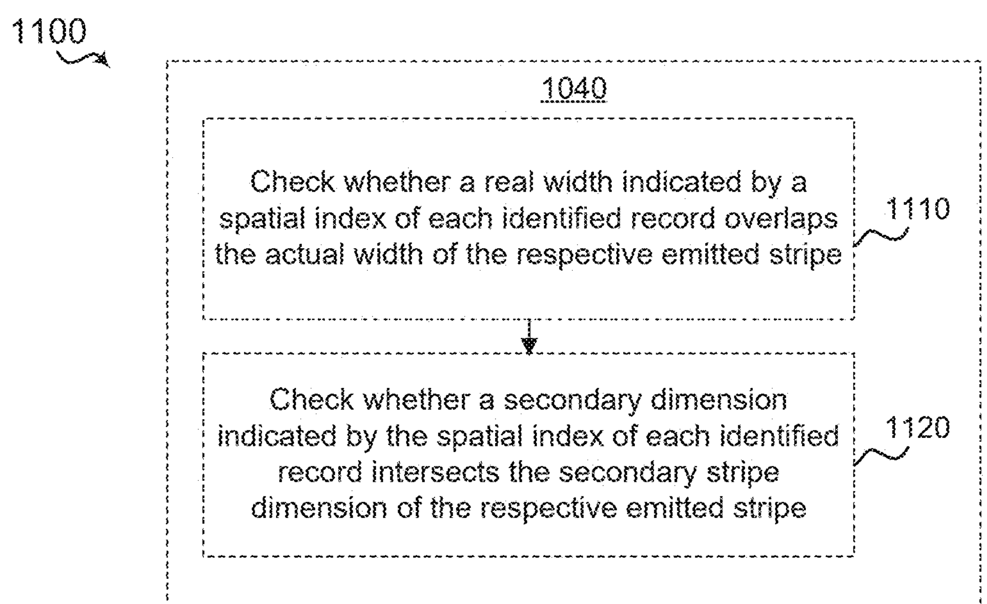
FIG. 11 is a flow diagram of an example method of filtering selected records, in accordance with aspects described herein.

Referring to FIG. 11, in an alternative or additional aspect, at block 1110, the filtering identified records based on an actual stripe width and a secondary stripe dimension of a respective emitted stripe to remove some false positive identifications at block 1040 may optionally include checking whether a real width indicated by a spatial index of each identified record overlaps the actual width of the respective emitted stripe. In this optional aspect, at block 1120, the filtering at block 1040 may include checking whether a secondary dimension indicated by the spatial index of each identified record intersects the secondary stripe dimension of the respective emitted stripe.

Figure 12:
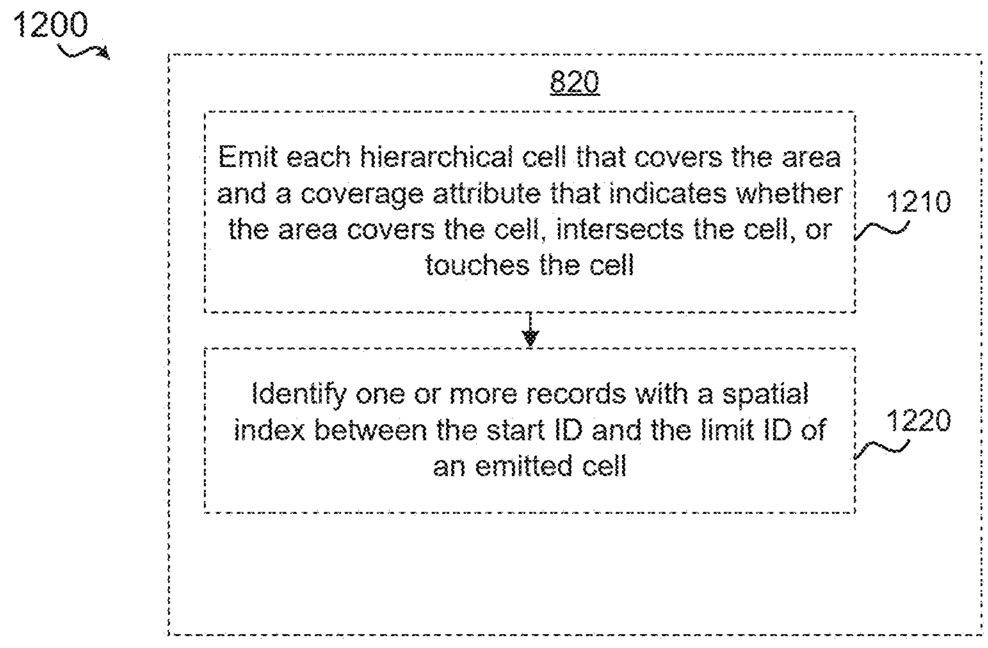
FIG. 12 is a flow diagram of an example method of selecting records based on a cell index, in accordance with aspects described herein.

Referring to FIG. 12, in an alternative or additional aspect, at block 1210, the selecting the record based on the spatial index being within a range of spatial indices for a spatial predicate at block 820 may include emitting each hierarchical cell that overlaps the area and a coverage attribute that indicates whether the area covers the cell, intersects the cell, or touches the cell. In this optional aspect, at block 1220, the selecting at block 820 may include identifying one or more records 140 with a spatial index (e.g., hybrid spatial index 150 or cell index 152) between the start ID and the limit ID of an emitted cell.

Figure 13:
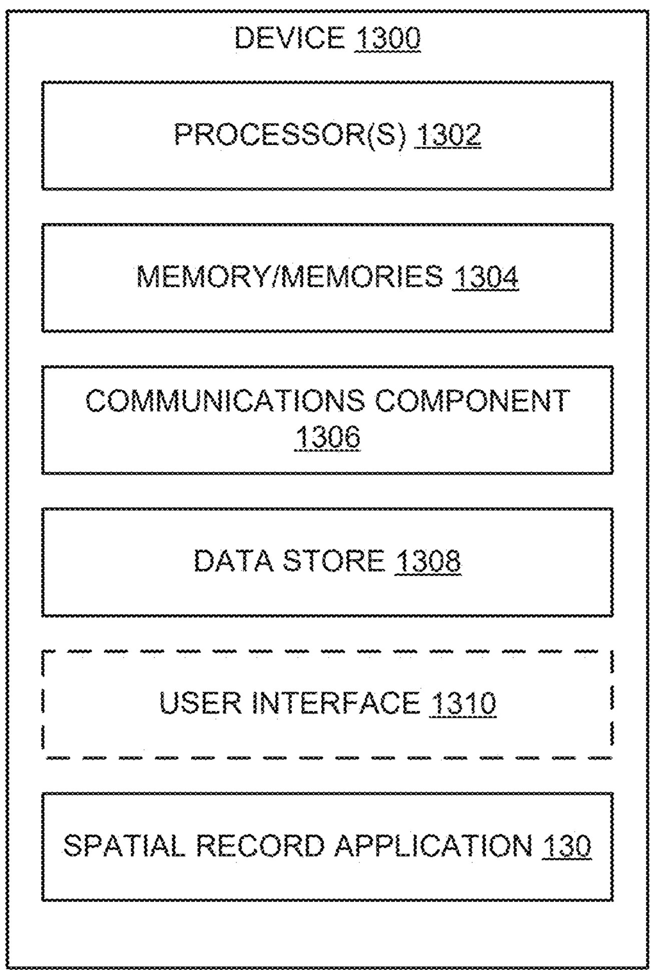
FIG. 13 is a schematic diagram of an example of a device for indexing data with a hybrid spatial index, in accordance with aspects described herein.

FIG. 13 illustrates an example of a device 1300 including additional optional component details as those shown in FIG. 7. In one aspect, device 1300 includes processor 1302, which may be similar to processor 1302 for carrying out processing functions associated with one or more of components and functions described herein. Processor 1302 can include a single or multiple set of processors or multi-core processors. Moreover, processor 1302 can be implemented as an integrated processing system and/or a distributed processing system.

Device 1300 further includes memory/memories 1304, which may be similar to memory/memories 704 such as for storing local versions of operating systems (or components thereof) and/or applications being executed by processor(s) 1302, such as the spatial record application 130, selection component 134, etc. Memory/memories 1304 can include a type of memory usable by a computer, such as random access memory (RAM), read only memory (ROM), tapes, magnetic discs, optical discs, volatile memory, non-volatile memory, and any combination thereof. The processor(s) 1302, individually or in combination, may execute instructions stored on the memory/memories 1304 to cause the device 1300 to perform the methods discussed above with respect to FIGS. 8-12.

Further, device 1300 includes a communications component 1306 that provides for establishing and maintaining communications with one or more other devices, parties, entities, etc. utilizing hardware, software, and services as described herein. Communications component 1306 carries communications between components on device 1300, as well as between device 1300 and external devices, such as devices located across a communications network and/or devices serially or locally connected to device 1300. For example, communications component 1306 may include one or more buses, and may further include transmit chain components and receive chain components associated with a wireless or wired transmitter and receiver, respectively, operable for interfacing with external devices.

Additionally, device 1300 may include a data store 1308, which can be any suitable combination of hardware and/or software, that provides for mass storage of information, databases, and programs employed in connection with aspects described herein. For example, data store 1308 may be or may include a data repository for operating systems (or components thereof), applications, related parameters, etc. not currently being executed by processor 1302. In addition, data store 1308 may be a data repository for the spatial record application 130.

Device 1300 may optionally include a user interface component 1310 operable to receive inputs from a user of device 1300 and further operable to generate outputs for presentation to the user. User interface component 1310 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 1310 may include one or more output devices, including but not limited to a display, a speaker, a haptic feedback mechanism, a printer, any other mechanism capable of presenting an output to a user, or any combination thereof.

Device 1300 additionally includes the spatial record application 130 for indexing records 140 using a hybrid spatial index 150.

In an aspect, the hybrid spatial index may provide improved performance for queries over conventional spatial indices. The queries involving spatial indices can logically be split into spatial queries and spatial joins, based on whether arguments of spatial predicates such as intersects, distance, etc. come from single table plus run-time constraints or two tables. Spatial joins are effectively implemented by using a nested loop join where one table acts as an outer reference, and inner side of the nested loop join is spatial query. The hybrid spatial index was tested against a conventional cell index for various common use cases including: point data, polygons of different sizes, spatial predicates with additional predicates or constraints. The tests were performed for both row stores and column stores. For the row store, the hybrid spatial index improved performance (e.g., query execution time) by 3 to 5 times for most use cases. Performance gain was much higher (>400 times) in the case of a TOP clause where a spatial index is used in both predicates. One case where the conventional spatial index was faster was with a complex spatial predicate defined by thousands of points (e.g., a long road). The selectivity of the primary filter for the hybrid spatial index was reduced in that scenario, while the secondary filter for the conventional spatial index is faster. For column stores, query plans for the conventional spatial index use index seeks within multiple nested loop joins, which is inefficient for column storage. The spatial hybrid index provides significant performance improvements over a clear scan with spatial filter on the conventional spatial index.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The following numbered clauses provide an overview of aspects of the present disclosure:

Clause 1. An apparatus for indexing data comprising: one or more memories, individually or in combination, storing computer-executable instructions; and one or more processors coupled to the one or more memories and, individually or in combination, configured to execute the instructions to: associate an integer spatial index with a record of an object, wherein the integer spatial index indicates a stripe of cells covering the object; and select the record based on the spatial index being within a range of spatial indices for a spatial predicate.

Clause 2. The apparatus of clause 1, wherein the spatial index includes an indication that the spatial index indicates the stripe of cells instead of a single cell indicated by another value of the indication.

Clause 3. The apparatus of clause 2, wherein to associate the integer spatial index with the record of the object, the one or more processors, individually or in combination, are configured to indicate the stripe of cells in response to determining that a hierarchical level or size of a single cell that includes the object satisfies a threshold.

Clause 4. The apparatus of any of clauses 1-3, wherein the spatial index encodes the indication, a direction of the stripe, a category of a width of the stripe, the width of the stripe based on the category, a start value of the stripe, and a second dimension of the stripe.

Clause 5. The apparatus of clause 4, wherein the spatial index includes 1 bit for the indication, 1 bit indicating a direction of the stripe, 2 bits that indicate a category of a width of the stripe, a number of bits encoding the width of the stripe based on the category, a start value of the stripe, and a number of bits encoding a second dimension of the stripe.

Clause 6. The apparatus of any of clauses 1-5, wherein to associate the integer spatial index with the record of the object, the one or more processors, individually or in combination, are configured to: determine a bounding box of the object on a grid with dimensions of 2 to a power of a number of bits for storing a starting location of the stripe; select a horizontal stripe or vertical stripe based on a horizontal dimension and a vertical dimension of the bounding box; determine a width of the selected stripe based on a corresponding dimension of the bounding box; encode a category of the width of the selected stripe into a category; encode a minimum value of the selected stripe as the number of bits for storing a starting location of the stripe; encode the width of the selected stripe as a number of bits based on the category; and encode a second dimension of the stripe as a number of remaining bits.

Clause 7. The apparatus of any of clauses 1-6, wherein to select the record based on the spatial index, the one or more processors, individually or in combination, are configured to: receive a query with the spatial predicate that indicates an area in which to select objects; emit a range of spatial indices from a start ID to a limit ID for one or more stripes that capture the area based on a direction and width category; identify any records with a spatial index between the start ID and the limit ID of each emitted stripe; and filter identified records based on an actual stripe width and a secondary stripe dimension of a respective emitted stripe to remove some false positive identifications.

Clause 8. The apparatus of clause 7, wherein to emit the range of spatial indices for a selected direction, the one or more processors, individually or in combination, are configured to: determine the start ID for the selected direction based on a minimum value for the direction of a bounding box of the area minus a maximal width of the width category for the selected direction; and determine the limit ID based on a maximum value of the width category for the selected direction.

Clause 9. The apparatus of clause 7 or 8, wherein to filter the identified record, the one or more processors, individually or in combination, are configured to: check whether a real width indicated by a spatial index of each identified record overlaps the actual width of the respective emitted stripe; and check whether a secondary dimension indicated by the spatial index of each identified record intersects the secondary stripe dimension of the respective emitted stripe.

Clause 10. The apparatus of any of clauses 7-9, wherein to select the record based on the spatial index, the one or more processors, individually or in combination, are further configured to: emit each hierarchical cell that overlaps the area and a coverage attribute that indicates whether the area covers the cell, intersects the cell, or touches the cell; and identify one or more records with a spatial index between the start ID and the limit ID of an emitted cell.

Clause 11. The apparatus of clause 2, wherein a second record is associated with a second spatial index that includes the other value of the indication, a plurality of indications of hierarchical cells, and an indication of a tessellation level.

Clause 12. A method of indexing data comprising: associating an integer spatial index with a record of an object, wherein the integer spatial index indicates a stripe of cells covering the object; and selecting the record based on the spatial index being within a range of spatial indices for a spatial predicate.

Clause 13. The method of clause 12, wherein the spatial index includes an indication that the spatial index indicates the stripe of cells instead of a single cell indicated by another value of the indication.

Clause 14. The method of clause 13, wherein associating the integer spatial index with the record of the object comprises determining to indicate the stripe of cells in response to determining that a hierarchical level or size of a single cell that includes the object satisfies a threshold.

Clause 15. The method of any of clauses 12-14, wherein the spatial index encodes the indication, a direction of the stripe, a category of a width of the stripe, the width of the stripe based on the category, a start value of the stripe, and a second dimension of the stripe.

Clause 16. The method of clause 15, wherein the spatial index includes 1 bit for the indication, 1 bit indicating a direction of the stripe, 2 bits that indicate a category of a width of the stripe, a number of bits encoding the width of the stripe based on the category, a start value of the stripe, and a number of bits encoding a second dimension of the stripe.

Clause 17. The method of any of clauses 12-16, wherein associating the integer spatial index with the record of the object comprises: determining a bounding box of the object on a grid with dimensions of 2 to a power of a number of bits for storing a starting location of the stripe; selecting a horizontal stripe or vertical stripe based on a horizontal dimension and a vertical dimension of the bounding box; determining a width of the selected stripe based on a corresponding dimension of the bounding box; encoding a category of the width of the selected stripe into a category; encoding a minimum value of the selected stripe as the number of bits for storing a starting location of the stripe; encoding the width of the selected stripe as a number of bits based on the category; and encoding a second dimension of the stripe as a number of remaining bits.

Clause 18. The method of any of clauses 12-17, wherein selecting the record based on the spatial index comprises: receiving a query with the spatial predicate that indicates an area in which to select objects; emitting a range of spatial indices from a start ID to a limit ID for one or more stripes that capture the area based on a direction and width category; identifying any records with a spatial index between the start ID and the limit ID of each emitted stripe; and filtering identified records based on an actual stripe width and a secondary stripe dimension of a respective emitted stripe to remove some false positive identifications.

Clause 19. The method of clause 18, wherein emitting the range of spatial indices for a selected direction comprises: determining the start ID for the selected direction based on a minimum value for the direction of a bounding box of the area minus a maximal width of the width category for the selected direction; and determining the limit ID based on a maximum value of the width category for the selected direction.

Clause 20. The method of clause 18 or 19, wherein filtering identified records comprises: checking whether a real width indicated by a spatial index of each identified record overlaps the actual width of the respective emitted stripe; and checking whether a secondary dimension indicated by the spatial index of each identified record intersects the secondary stripe dimension of the respective emitted stripe.

Clause 21. The method of any of clauses 18-20, wherein selecting the record based on the spatial index further comprises: emitting each hierarchical cell that overlaps the area and a coverage attribute that indicates whether the area covers the cell, intersects the cell, or touches the cell; and identifying one or more records with a spatial index between the start ID and the limit ID of an emitted cell.

Clause 22. The method of clause 13, wherein a second record is associated with a second spatial index that includes the other value of the indication, a plurality of indications of hierarchical cells, and an indication of a tessellation level.

Clause 23. One or more non-transitory computer-readable storage media having stored thereon computer-executable instructions that when executed by one or more processors cause the one or more processors, individually or in combination, to: associate an integer spatial index with a record of an object, wherein the integer spatial index indicates a stripe of cells covering the object; and select the record based on the spatial index being within a range of spatial indices for a spatial predicate.

The one or more non-transitory computer-readable storage media of clause 23, comprising instructions to cause the one or more processors, individually or in combination, to perform the method of any of clauses 13-22.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for indexing data comprising:

one or more memories, individually or in combination, storing computer-executable instructions; and one or more processors coupled to the one or more memories and, individually or in combination, configured to execute the instructions to:

associate an integer spatial index with a record of an object, wherein the integer spatial index indicates a stripe of cells covering the object and encodes two or more of the following parameters: an indication that the spatial index indicates the stripe of cells, a direction of the stripe, a category of a width of the stripe, the width of the stripe based on the category, a start value of the stripe, or a second dimension of the stripe as a number of bits within the integer spatial index representing a respective value of each encoded parameter; and select the record based on the spatial index being within a range of spatial indices for a spatial predicate.

2. The apparatus of claim 1, wherein the spatial index includes an indication that the spatial index indicates the stripe of cells instead of a single cell indicated by another value of the indication.

3. The apparatus of claim 2, wherein to associate the integer spatial index with the record of the object, the one or more processors, individually or in combination, are configured to indicate the stripe of cells in response to determining that a hierarchical level or size of a single cell that includes the object satisfies a threshold.

4. The apparatus of claim 2, wherein a second record is associated with a second spatial index that includes the other value of the indication, a plurality of indications of hierarchical cells, and an indication of a tessellation level.

5. The apparatus of claim 1, wherein the spatial index includes 1 bit for the indication, 1 bit indicating a direction of the stripe, 2 bits that indicate a category of a width of the stripe, a number of bits encoding the width of the stripe based on the category, a start value of the stripe, and a number of bits encoding a second dimension of the stripe.

6. The apparatus of claim 1, wherein to associate the integer spatial index with the record of the object, the one or more processors, individually or in combination, are configured to:

determine a bounding box of the object on a grid with dimensions of 2 to a power of a number of bits for storing a starting location of the stripe;

select a horizontal stripe or vertical stripe based on a horizontal dimension and a vertical dimension of the bounding box;

determine a width of the selected stripe based on a corresponding dimension of the bounding box;

encode a category of the width of the selected stripe into a category;

encode a minimum value of the selected stripe as the number of bits for storing a starting location of the stripe;

encode the width of the selected stripe as a number of bits based on the category; and encode a second dimension of the stripe as a number of remaining bits.

7. The apparatus of claim 1, wherein to select the record based on the spatial index, the one or more processors, individually or in combination, are configured to:

receive a query with the spatial predicate that indicates an area in which to select objects;

emit a range of spatial indices from a start ID to a limit ID for one or more stripes that capture the area based on a direction and width category;

identify any records with a spatial index between the start ID and the limit ID of each emitted stripe; and filter identified records based on an actual stripe width and a secondary stripe dimension of a respective emitted stripe to remove some false positive identifications.

8. The apparatus of claim 7, wherein to emit the range of spatial indices for a selected direction, the one or more processors, individually or in combination, are configured to:

determine the start ID for the selected direction based on a minimum value for the direction of a bounding box of the area minus a maximal width of the width category for the selected direction; and determine the limit ID based on a maximum value of the width category for the selected direction.

9. The apparatus of claim 7, wherein to filter the identified record, the one or more processors, individually or in combination, are configured to:

check whether a real width indicated by a spatial index of each identified record overlaps the actual width of the respective emitted stripe; and check whether a secondary dimension indicated by the spatial index of each identified record intersects the secondary stripe dimension of the respective emitted stripe.

10. The apparatus of claim 7, wherein to select the record based on the spatial index, the one or more processors, individually or in combination, are further configured to:

emit each hierarchical cell that overlaps the area and a coverage attribute that indicates whether the area covers the cell, intersects the cell, or touches the cell; and identify one or more records with a spatial index between the start ID and the limit ID of an emitted cell.

11. A method of indexing data comprising:

associating an integer spatial index with a record of an object, wherein the integer spatial index indicates a stripe of cells covering the object and encodes two or more of the following parameters: an indication that the spatial index indicates the stripe of cells, a direction of the stripe, a category of a width of the stripe, the width of the stripe based on the category, a start value of the stripe, or a second dimension of the stripe as a number of bits within the integer spatial index representing a respective value of each encoded parameter; and selecting the record based on the spatial index being within a range of spatial indices for a spatial predicate.

12. The method of claim 11, wherein the spatial index includes an indication that the spatial index indicates the stripe of cells instead of a single cell indicated by another value of the indication.

13. The method of claim 12, wherein associating the integer spatial index with the record of the object comprises determining to indicate the stripe of cells in response to determining that a hierarchical level or size of a single cell that includes the object satisfies a threshold.

14. The method of claim 12, wherein a second record is associated with a second spatial index that includes the other value of the indication, a plurality of indications of hierarchical cells, and an indication of a tessellation level.

15. The method of claim 11, wherein the spatial index includes 1 bit for the indication, 1 bit indicating a direction of the stripe, 2 bits that indicate a category of a width of the stripe, a number of bits encoding the width of the stripe based on the category, a start value of the stripe, and a number of bits encoding a second dimension of the stripe.

16. The method of claim 11, wherein associating the integer spatial index with the record of the object comprises:

determining a bounding box of the object on a grid with dimensions of 2 to a power of a number of bits for storing a starting location of the stripe;

selecting a horizontal stripe or vertical stripe based on a horizontal dimension and a vertical dimension of the bounding box;

determining a width of the selected stripe based on a corresponding dimension of the bounding box;

encoding a category of the width of the selected stripe into a category;

encoding a minimum value of the selected stripe as the number of bits for storing a starting location of the stripe;

encoding the width of the selected stripe as a number of bits based on the category; and encoding a second dimension of the stripe as a number of remaining bits.

17. The method of claim 11, wherein selecting the record based on the spatial index comprises:

receiving a query with the spatial predicate that indicates an area in which to select objects;

emitting a range of spatial indices from a start ID to a limit ID for one or more stripes that capture the area based on a direction and width category;

identifying any records with a spatial index between the start ID and the limit ID of each emitted stripe; and filtering identified records based on an actual stripe width and a secondary stripe dimension of a respective emitted stripe to remove some false positive identifications.

18. The method of claim 17, wherein emitting the range of spatial indices for a selected direction comprises:

determining the start ID for the selected direction based on a minimum value for the direction of a bounding box of the area minus a maximal width of the width category for the selected direction; and determining the limit ID based on a maximum value of the width category for the selected direction.

19. The method of claim 17, wherein filtering identified records comprises:

checking whether a real width indicated by a spatial index of each identified record overlaps the actual width of the respective emitted stripe; and checking whether a secondary dimension indicated by the spatial index of each identified record intersects the secondary stripe dimension of the respective emitted stripe.

20. The method of claim 17, wherein selecting the record based on the spatial index further comprises:

emitting each hierarchical cell that overlaps the area and a coverage attribute that indicates whether the area covers the cell, intersects the cell, or touches the cell; and identifying one or more records with a spatial index between the start ID and the limit ID of an emitted cell.

21. One or more non-transitory computer-readable storage media having stored thereon computer-executable instructions that when executed by one or more processors cause the one or more processors, individually or in combination, to:

associate an integer spatial index with a record of an object, wherein the integer spatial index indicates a stripe of cells covering the object and encodes two or more of the following parameters: an indication that the spatial index indicates the stripe of cells, a direction of the stripe, a category of a width of the stripe, the width of the stripe based on the category, a start value of the stripe, or a second dimension of the stripe as a number of bits within the integer spatial index representing a respective value of each encoded parameter; and select the record based on the spatial index being within a range of spatial indices for a spatial predicate.

* * * * *